United States Patent
Katoh et al.

(10) Patent No.: US 8,046,880 B2
(45) Date of Patent: Nov. 1, 2011

(54) CLIP

(75) Inventors: Makoto Katoh, Toyota (JP); Haruhisa Kamiya, Anjo (JP); Toshio Iwahara, Okazaki (JP); Tetsuya Ogino, Toyota (JP); Shinichi Sawada, Aichi-ken (JP); Minoru Shibata, Aichi-ken (JP); Yasuhiro Sakakibara, Aichi-ken (JP)

(73) Assignees: Daiwa Kasei Industry Co., Ltd., Okazaki-shi (JP); Toyoda Gosei Co., Ltd., Nishikasugai-gun (JP)

( * ) Notice: Subject to any disclaimer, the term of this patent is extended or adjusted under 35 U.S.C. 154(b) by 458 days.

(21) Appl. No.: 12/308,939

(22) PCT Filed: Aug. 1, 2007

(86) PCT No.: PCT/JP2007/065562
§ 371 (c)(1),
(2), (4) Date: Jan. 27, 2009

(87) PCT Pub. No.: WO2008/016177
PCT Pub. Date: Feb. 7, 2008

(65) Prior Publication Data
US 2009/0199371 A1    Aug. 13, 2009

(30) Foreign Application Priority Data
Aug. 2, 2006   (JP) ................................ 2006-211205

(51) Int. Cl.
F16B 5/12    (2006.01)
F16B 21/10   (2006.01)
B60R 13/02   (2006.01)
B60R 7/04    (2006.01)
F16B 5/06    (2006.01)

(52) U.S. Cl. ......... 24/458; 24/581.11; 24/297; 280/752; 296/1.08; 296/146.7

(58) Field of Classification Search ................ 24/458, 24/572.1, 572.09, 581.1, 581.11, 289, 297; 296/1.08, 146.7, 191, 39.1; 280/752
See application file for complete search history.

(56) References Cited

U.S. PATENT DOCUMENTS

| | | | | |
|---|---|---|---|---|
| 4,698,882 | A * | 10/1987 | Lang | 24/289 |
| 4,981,405 | A * | 1/1991 | Kato | 24/297 |
| 6,594,870 | B1 | 7/2003 | Lambrecht et al. | |
| 7,165,371 | B2 * | 1/2007 | Yoyasu | 24/297 |
| 7,178,850 | B2 * | 2/2007 | Smith et al. | 24/297 |

(Continued)

FOREIGN PATENT DOCUMENTS

| FR | 2 873 768 A1 | 2/2006 |
|---|---|---|
| JP | A-7-332322 | 12/1995 |

(Continued)

*Primary Examiner* — Robert Sandy
(74) *Attorney, Agent, or Firm* — Oliff & Berridge, PLC

(57) ABSTRACT

A long hole of a seat plate member is fittingly inserted to a fitting head portion provided on an upper surface of a flat plate portion of a clip in an upright posture, so as to attach the clip to the cutaway groove portion with the seat plate member in contact with a flat plate portion, and the fitting head portion is fitted to a long hole formed in an attachment receiving member. As the fitting head portion is fitted to the long hole, the boss portion moves within the cutaway groove portion to bring the seat plate member into contact with the attachment receiving member and to elastically lock a pair of elastic locking pieces with the periphery of each longer side portion of the long hole.

6 Claims, 24 Drawing Sheets

U.S. PATENT DOCUMENTS

| | | | |
|---|---|---|---|
| 7,290,795 B2 * | 11/2007 | Kawai et al. | 24/297 |
| 7,954,205 B2 * | 6/2011 | Xueyong et al. | 24/289 |
| 2006/0032030 A1 * | 2/2006 | Nessel et al. | 24/289 |
| 2008/0235919 A1 * | 10/2008 | Giddings et al. | 24/289 |

FOREIGN PATENT DOCUMENTS

| | | |
|---|---|---|
| JP | A-9-250521 | 9/1997 |
| JP | A-11-70838 | 3/1999 |
| JP | A-2002-21824 | 1/2002 |

* cited by examiner

Y DIRECTION

X DIRECTION

FIG. 39
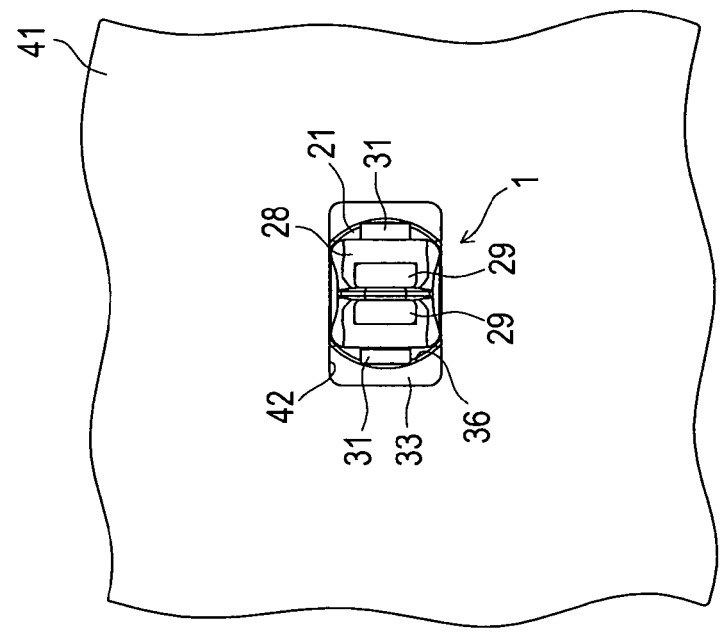
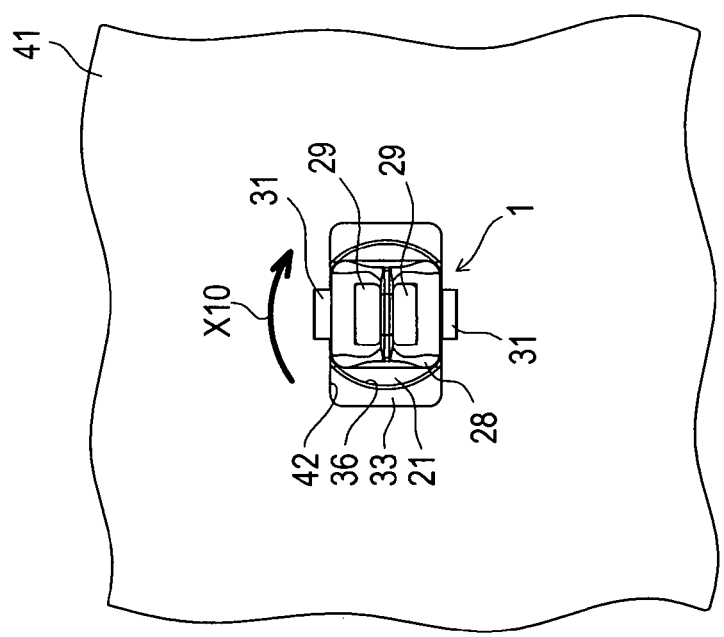

CLIP

TECHNICAL FIELD

The present invention relates to a clip for use in attaching an attachment member such as a console box and an instrument panel to an attachment receiving member such as an automobile body. In particular, the present invention relates to a clip that enables attachment and detachment of the attachment member to and from the attachment receiving member in an extremely easy one-touch operation while the clip is always integrally handled with the attachment member to which the clip is assembled.

BACKGROUND ART

Conventionally, various kinds of clips have been proposed for use in attaching a console box, instrument panel, and the like to various kinds of panels constituting an automobile body.

For example, there is a console device to be attached on a floor of a vehicle body. In attaching the console device on the floor of the vehicle body, a fitting hole formed on a flange of the console box and a through hole formed on a seat portion are aligned to two fitting holes formed on the floor of the vehicle body, and in this state, a clip comprising an outer member and an inner member is inserted through the holes (for example, see Patent Document 1).

[Patent Document 1] Japanese Unexamined Patent Publication No. 11(1998)-70838, paragraphs [0028] to [0037] and FIG. 2

In the clip comprising the outer member and inner member described in the Patent Document 1, when the inner member is withdrawn from the outer member, the diameter of the outer member is decreased to enable the clip to be detached from the respective fitting holes of the floor and the flange, the fitting hole of the floor, and the through hole of the seating portion. When the inner member is inserted into the outer member, the diameter of the outer member is enlarged to restrict the clip by the respective fitting holes and through hole, so as to fasten the console box to the floor of the vehicle body.

DISCLOSURE OF THE INVENTION

When the console box is fastened to the floor of the vehicle body by use of the clip for use in the console device described in the Patent Document 1 the positional deviation between the respective fitting holes of the console box and the respective long holes of the floor in the longitudinal direction of the long holes can be absorbed by imparting a long hole shape to the respective fitting holes created on the floor of the vehicle body. However, there still remains a problem that the positional deviation in a direction at right angle relative to this longitudinal direction cannot be absorbed.

In addition, to fasten the console box to the floor of the vehicle body, first of all, it is required to take an operation of positioning the console box on the floor of the vehicle body, and in this state, inserting the clip through the fitting holes and long holes, and subsequently, to take an operation of inserting the inner member to the outer member by depressing the inner member into the outer member. These operations are much troublesome, and lead to a problem that much time is required for fastening the console box to the floor of the vehicle body.

The present invention has been made to solve the problems described above, and an objective thereof is to provide a clip which is capable of easily absorbing the positional deviation of the attachment member relative to the attachment receiving member in a state where the clip is always integrally handled with the attachment member to which the clip is assembled, and which also enables attachment and detachment of the attachment member to and from the attachment receiving member in an extremely easy one-touch operation.

To achieve the object, the present invention provides a clip assembled to an upper surface portion of a pedestal portion provided on one surface of an attachment member and used to attach the attachment member to an attachment receiving member, wherein the pedestal portion comprises a horizontally long cutaway groove portion protruded into a substantially square-bracket-like shape opened downward when seen from side and formed inward from a side surface portion at one side of an upper wall, the attachment member comprises a pair of positioning boss portions provided in an upright posture outside the opposite side wall portions of the pedestal portion and formed with a plurality of positioning grooves on its upper end surface portion formed successively in a direction at substantially right angle relative to a longitudinal direction of the cutaway groove portion, wherein the clip comprising: a flat plate portion to be brought into contact with an upper surface portion of the upper wall; a boss portion extended vertically downward from a bottom surface of the flat plate portion and has a width substantially equal to a width of the cutaway groove portion, and is fitted to the cutaway groove portion; a flange portion having a predetermined thickness and extended from a lower end portion of the boss portion outward to the opposite sides of the cutaway groove portion so as to be brought into contact with a bottom surface portion of the upper wall; a fitting head portion having a substantially square shape when seen from top, provided in an upright posture on an upper surface of the flat plate portion and fitted to a first long hole penetratively formed in the attachment receiving member along a direction at substantially right angle relative to a longitudinal direction of the cutaway groove portion; a pair of elastic locking pieces elastically deformable in a insertion direction of the fitting head portion, the elastic locking pieces provided on opposite side surface portions of the fitting head portion in a longitudinal direction of the cutaway groove portion, and each being formed with a locking protrusion in an upright posture outward from its lower end to a predetermined height; and a flat plate-like seat plate member formed with a second long hole having a width substantially equal to a width of the fitting head portion in a direction at substantially right angle relative to a longitudinal direction of the cutaway groove portion, and the fitting head portion being fittingly inserted into the second long hole so as to be brought into contact with an upper surface of the flat plate portion; a pair of positioning locking pieces elastically deformable in the vertical direction, having a protruded positioning rib to be fitted to the positioning groove on the lower surface of the top end, and extended outward from both end edges in the longitudinal direction of the second hole of the seat plate member, wherein, as the fitting head portion is fitted to a first long hole penetratively formed in the attachment receiving member, the boss portion moves within the cutaway groove portion to bring the seat plate member into contact with the attachment receiving member and to elastically lock the pair of elastic locking pieces with a periphery of each longer side portion of the first long hole, and when an upper end surface of the seat plate member is brought into contact with the attachment receiving member, the positioning locking piece is depressed by the attachment receiving member to be in substantially flush with an upper end surface of the seat plate member, and at the same time, the positioning rib portion is fitted to the opposing positioning groove portion.

Furthermore, the inventive clip further comprises an elongated thin plate-like connecting portion for connecting one of the edges in a longitudinal direction of the second long hole of the seat plate member to be brought into contact with the flat plate portion and a side edge of a flat plate portion opposing the corresponding edge, wherein the connecting portion is formed into such a length that fittingly inserts the fitting head portion into second long hole of the seat plate member.

Furthermore, the inventive clip further comprises a convex portion protruded from a midportion at a lower end of the flange portion, wherein the attachment member comprising: a rib portion provided in an upright posture outward from one of side surfaces of the upper wall of the pedestal portion; and an extending portion elastically deformable downward, extending from a height opposing to the convex portion of the rib portion substantially vertically up to an inlet portion of the cutaway groove portion, wherein, when the boss portion is fitted to the cutaway groove portion, the convex portion moves while depressing the extending portion downward.

Furthermore, in the inventive clip, the attachment member has a tool hole penetratively formed in a pedestal portion at a position opposing to an upper wall portion, the convex portion has a recessed portion which is formed on a bottom surface portion and into which a top end portion of a tool is inserted, portions of the fitting head portion opposing to inner peripheral surfaces of the first long hole and second long hole and the boss portion respectively constitute a substantially square shape as a whole in a horizontal cross section, and a pair of opposing corners creates a circular arc having one side of the each square as a diameter, and the other opposing corners create substantially right angle, and a tool is inserted into the recessed portion through the tool hole to be rotated by 90 degrees counterclockwise so as to release the locked state between the first long hole and the pair of elastic locking pieces.

According to the clip of the present invention, the boss portion vertically extended downward from the bottom surface of the flat plate portion of the clip is slipped into a horizontally long cutaway groove portion formed on the upper wall of the pedestal portion of the attachment member from one side surface portion. As a result, the upper wall of the pedestal portion is pinched between the flat plate portion and the flange portion formed on the lower end portion of the boss portion. Therefore, the clip can be always handled integrally with the attachment member to which the clip is assembled.

Further, the second long hole of the seat plate member is fittingly inserted to the fitting head portion provided on the upper surface of the flat plate portion of the clip in an upright posture in such a manner that the second long hole is placed along the direction at substantially right angle relative to the longitudinal direction of the cutaway groove portion. Then, after the boss portion is slipped into and assembled to the cutaway groove portion of the pedestal portion in a state where the seat plate member is in contact with the flat plate portion, the fitting head portion is fitted to the first long hole penetratively formed in the attachment receiving member along the direction at substantially right angle relative to the longitudinal direction of the cutaway groove portion. As the fitting head portion is fitted to the first long hole penetratively formed in the attachment receiving member, the boss portion moves within the cutaway groove portion to bring the seat plate member into contact with the attachment receiving member and to elastically lock a pair of elastic locking pieces with the periphery of each longer side portion of said first long hole.

As a result, the positional deviation of the attachment member relative to the longitudinal direction of the first long hole of the attachment receiving member can be absorbed. In addition, as the boss portion vertically extended downward from the bottom surface of the flat plate portion of the clip moves within the cutaway groove portion, the clip moves in a direction at right angle relative to the longitudinal direction of the first long hole. Therefore, the positional deviation of the attachment member in the direction at right angle relative to the longitudinal direction of the first long hole can also be absorbed.

Thus, the positional deviation of the attachment member relative to the attachment receiving member can be easily absorbed in a state where the clip is always integrally handled with the attachment member to which the clip is assembled. As a result, the attachment member can be attached to the attachment receiving member in an extremely easy one-touch operation. By providing a plurality of pedestal portions to the attachment member, after the attachment member is attached to the attachment receiving member, the positional deviation relative to the attachment receiving member and rattling of the attachment member due to the impact force externally exerted to the attachment member can be assuredly prevented.

When the upper end surface of the seat plate member to be in contact with the flat plate portion is brought into contact with the attachment receiving member, each positioning locking piece is depressed by said attachment receiving member to be in substantially flush with the upper end surface of said seat plate member. At the same time, the positioning rib portion protruding from the lower surface of the top end portion of each positioning locking piece is fitted to an opposing positioning groove among a plurality of positioning grooves formed on the upper end surface of each positioning boss portion.

Accordingly, since the plurality of positioning grooves formed on the upper end surface of each positioning boss portion is arranged in the direction at substantially right angle relative to the longitudinal direction of the cutaway groove portion of the pedestal portion, and the width of the second long hole of the seat plate member is substantially equal to the width of the fitting head portion, as the positioning rib portion protruded from the lower surface at the top end portion of each positioning locking piece is fitted to the opposing positioning groove portion, the movement of the clip along the longitudinal direction of the cutaway groove portion, that is, the positional deviation relative to the attachment member and rattling of the clip due to the impact force exerted after the attachment member is attached to the attachment receiving member can be prevented.

Further, in the clip of the present invention, if one of the edge portions in a longitudinal direction of the second long hole of the seat plate member and the side edge portion of the flat plate portion opposing to said one of the edge portions are connected to each other by means of elongated thin plate-like connecting portions each formed into such a length that enables the fitting head portion to be fittingly inserted into the second long hole of the seat plate member, the seat plate member and the connecting members can be integrally molded with the flat plate portion. As a result, the number of parts can be reduced. Further, if each connecting portion is connected to one of the edge portions in a longitudinal direction of the second long hole of the seat plate member, the connecting portion is folded and the fitting head portion can be fittingly inserted into the second long hole of the seat plate member so that the inserting direction of the seat plate member can be aligned to the fitting head portion. As a result, the operability can be enhanced.

Further, in the clip of the present invention, a convex portion is formed at the midportion on the lower end of the flange portion. The convex portion moves as it depresses the extending portion downward to fit the boss portion to the cutaway groove portion. Thus, said convex portion opposes to the extending portion extended up to the inlet portion of the cutaway groove portion. Due to this structure, after the clip is attached to the pedestal portion, the clip can be assuredly prevented from slipping off due to the impact force externally exerted during when the attachment member is transferred.

Further, in the clip of the present invention, if the locked state between the first long hole of the attachment receiving member and a pair of elastic locking pieces of the clip is made releasable by inserting a tool into the recessed portion of the clip through the tool hole to rotate the clip by 90 degrees counterclockwise, the attachment member can be detached from the attachment receiving member in an extremely easy operation as is the case of screw cramp.

BRIEF DESCRIPTION OF THE DRAWINGS

FIG. 39 is a bottom surface view in the case where the locked state between the clip and the attachment receiving member is released by means of a tool.

Figure 1:
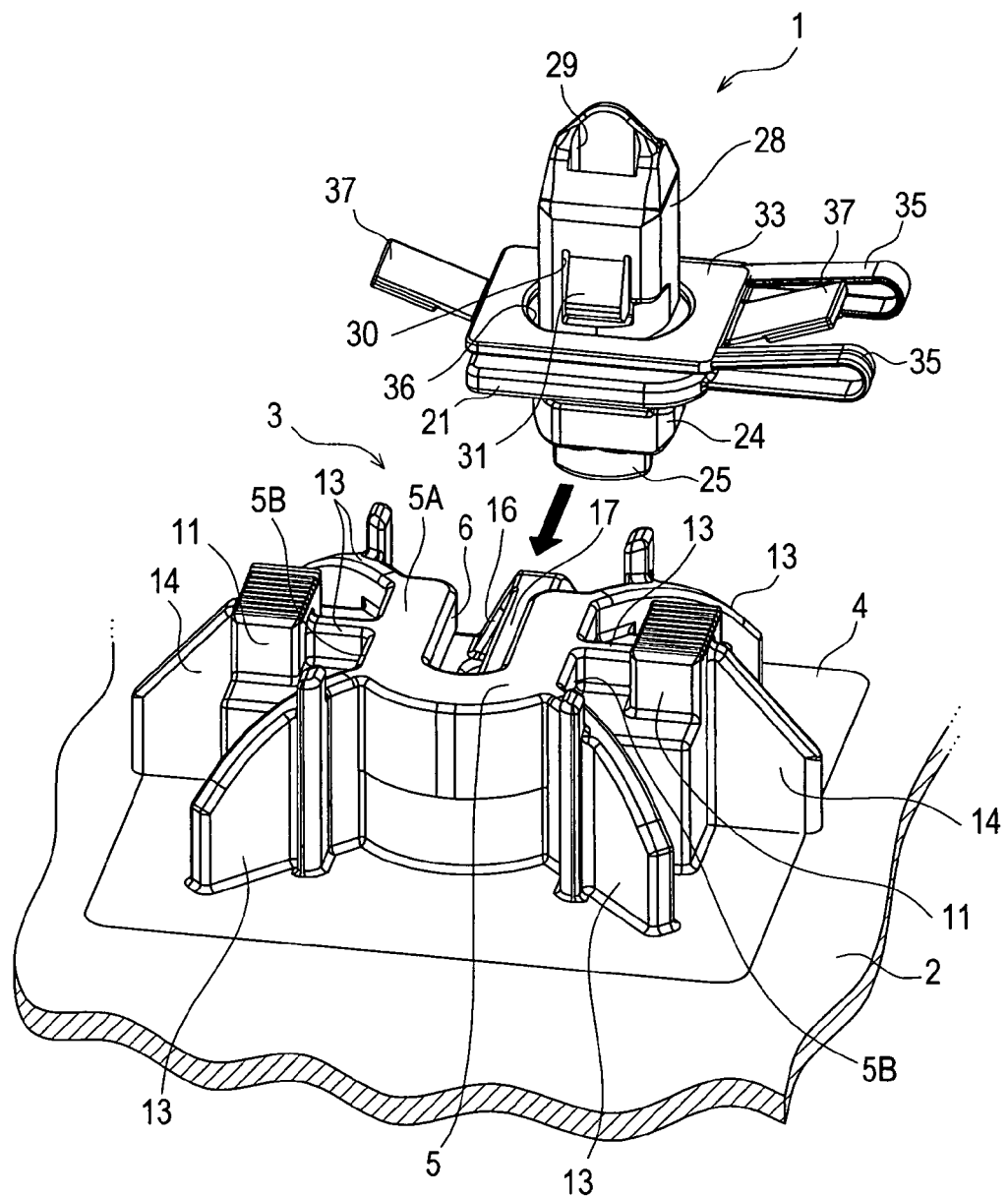
FIG. 1 is a perspective view schematically showing the clip according to this embodiment and the assembling portion of the attachment member to which said clip is assembled.

EXPLANATION OF REFERENCES 1 clip
2 attachment member
3 assembling portion
4 pedestal portion
5A upper wall
6 cutaway groove portion
8 tool hole
10 positioning groove
11 positioning boss portion
21 flat plane portion
22 boss portion
24 flange portion
25 convex portion
26 recessed portion
28 fitting head portion
31 elastic locking pieces
33 seat plate member
35 connecting portion
36, 42 long holes
37 positional locking piece
38 positioning rib portion
41 attachment receiving member
100 tool

BEST MODE FOR CARRYING OUT THE INVENTION

Hereinafter, a clip according to the present invention will be described in detail with reference to the drawings based on an embodiment which has embodied the present invention. First, an entire structure related to the clip according to this embodiment and an assembling portion of an attachment member is described based on FIG. 1.

FIG. 1 is a perspective view schematically showing the clip according to this embodiment and the assembling portion of the attachment member to which said clip is assembled.

In FIG. 1, the clip 1 is assembled to the assembling portion 3 of the attachment member 2.

Here, first of all, a schematic structure of the assembling portion 3 of the attachment member 2 will be described based on FIGS. 1 to 8.

Figure 2:
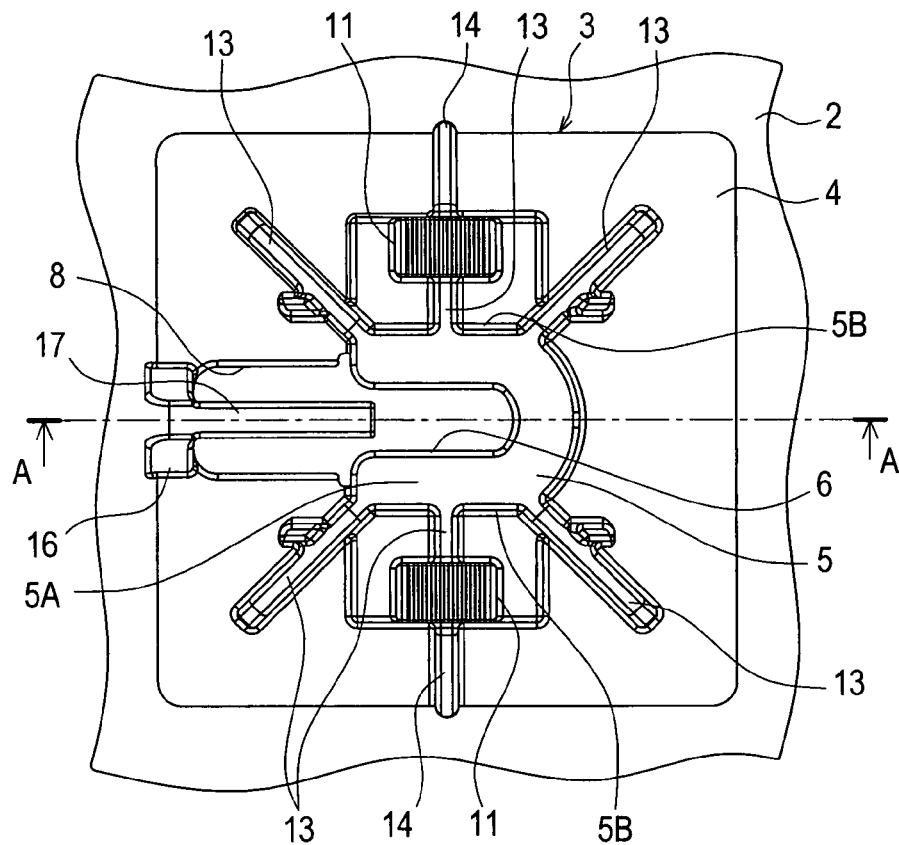
FIG. 2 is a plan view showing the assembling portion of the attachment member.
Figure 3:
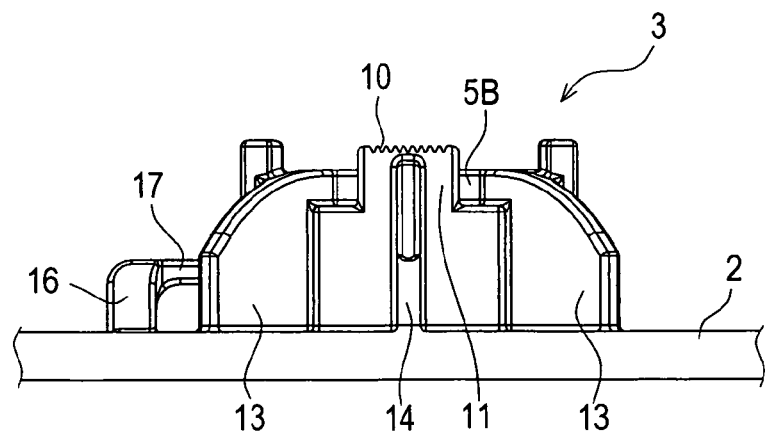
FIG. 3 is a front view showing the assembling portion of the attachment member.
Figure 4:
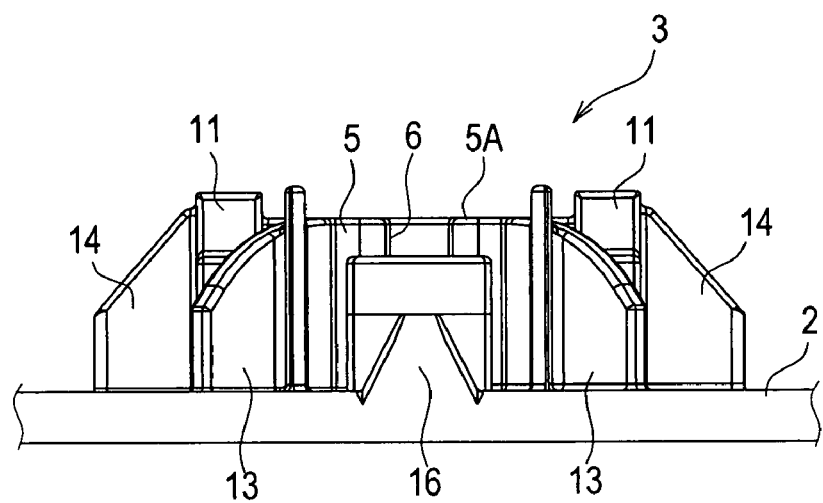
FIG. 4 is a left side view showing the assembling portion of the attachment member.
Figure 5:
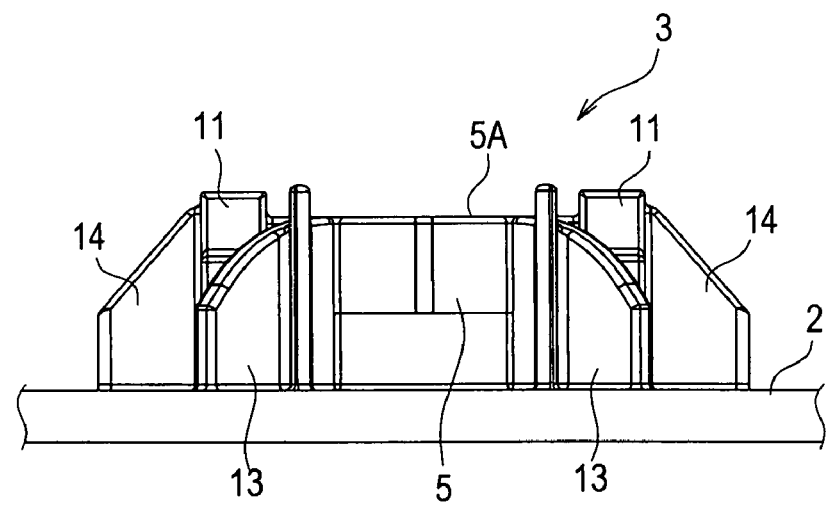
FIG. 5 is a right side view showing the assembling portion of the attachment member.
Figure 6:
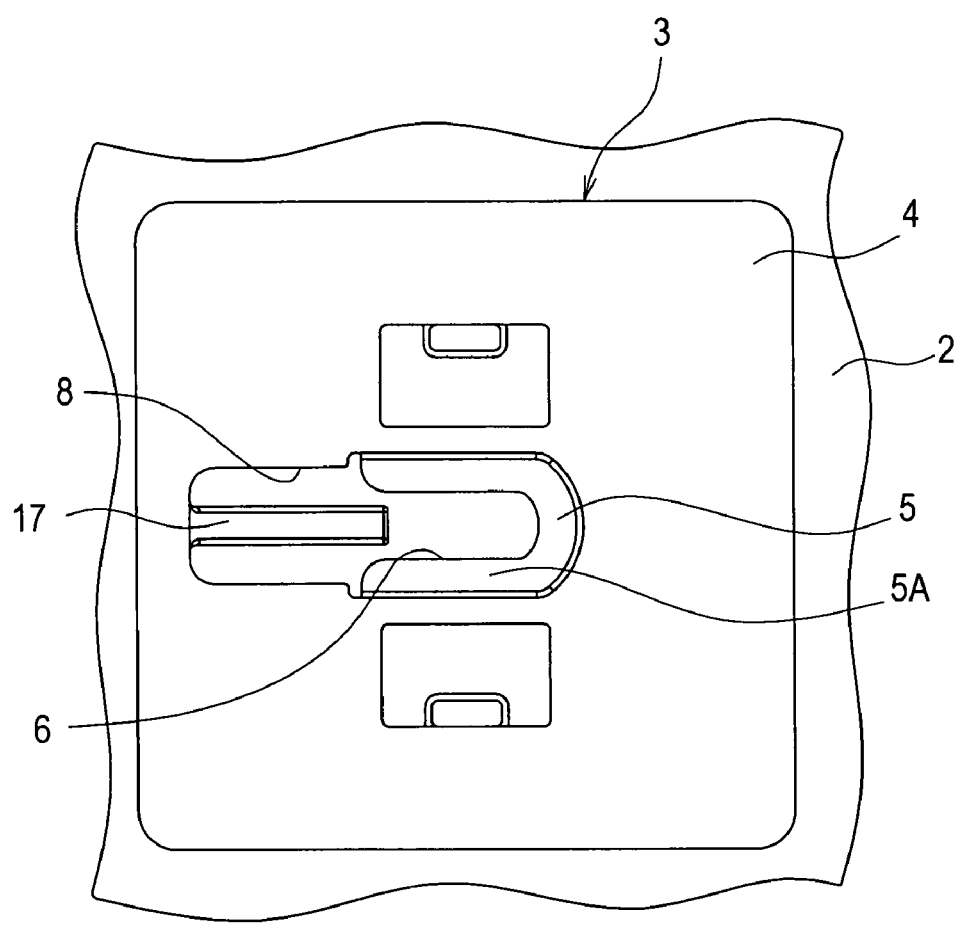
FIG. 6 is a bottom view showing the assembling portion of the attachment member.
Figure 7:
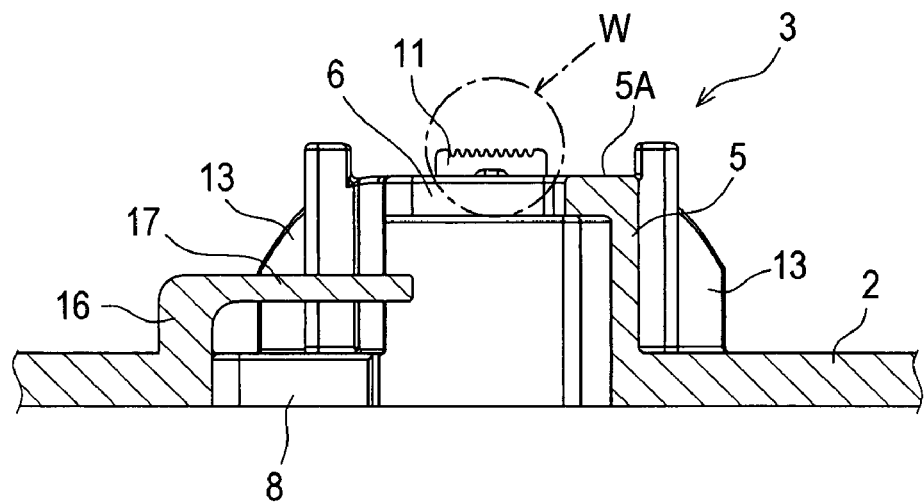
FIG. 7 is a cross-sectional view taken along the line A-A of FIG. 2.
Figure 8:
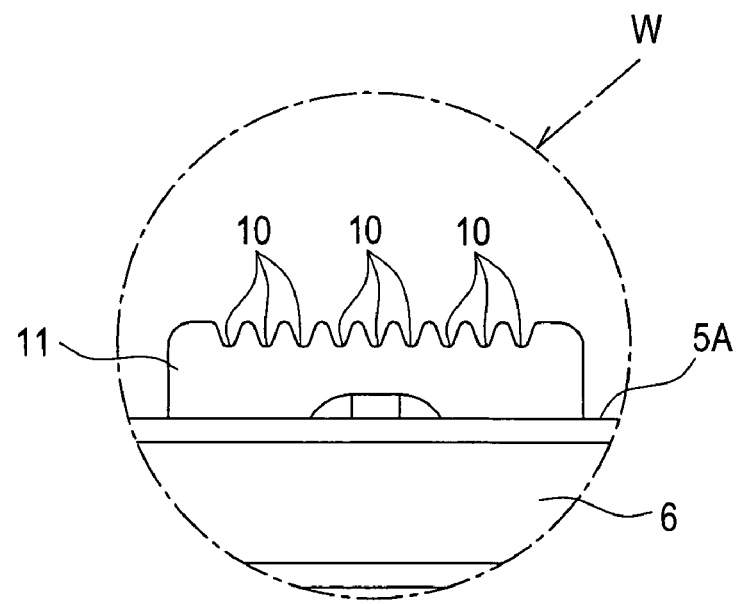
FIG. 8 is an enlarged diagram of a W portion of FIG. 7.

FIG. 2 is a plan view showing the assembling portion 3 of the attachment member 2. FIG. 3 is a front view showing the assembling portion 3 of the attachment member 2. FIG. 4 is a left side view showing the assembling portion 3 of the attachment member 2. FIG. 5 is a right side view showing the assembling portion 3 of the attachment member 2. FIG. 6 is a bottom view showing the assembling portion 3 of the attachment member 2. FIG. 7 is a cross-sectional view taken along the line A-A of FIG. 2. FIG. 8 is an enlarged diagram of a W portion of FIG. 7.

In FIGS. 1 to 8, the assembling portion 3 of the attachment member 2 is integrally molded with the attachment member 2 such as a console box and instrumental panel by means of various resins such as polypropylene.

As shown in FIGS. 1 to 8, the assembling portion 3 is provided on one surface of the attachment member 2 (in FIG. 1, on the upper surface), and has a base end portion 4 integrally molded with the attachment member 2 by one of various molding methods.

The base end portion 4 has a pedestal portion 5 substantially in the shape of the downward-opened square bracket when seen from the side. The midportion of an upper wall 5A of the pedestal portion 5 is cut away inward from one side surface portion so as to form a horizontally long cutaway groove portion 6. Further, a tool hole 8 having a substantially horizontally long square shape is penetratively formed in the base end portion 4 opposing to the upper wall 5A of the pedestal portion 5 and in a portion of the base end portion 4 at a predetermined length (for example, approximately 5 to 8 mm) outward from the inlet portion of the cutaway groove portion 6 of said pedestal portion 5.

Further, from the base end portion 4, a pair of positioning boss portions 11 is provided in an upright posture outside the substantially midportion in a longitudinal direction of the opposite side wall portions 5B of the pedestal portion 5. On an upper end surface portion of each positioning boss portion 11, a plurality of positioning grooves 10 (see FIG. 8) of a predetermined depth (in this embodiment, the depth is approximately 0.4 mm to 0.5 mm) formed in a direction at substantially right angle relative to a longitudinal direction of the cutaway groove portion 6 is successively arranged along this longitudinal direction. Further, each positioning boss 11 is provided so as to oppose to each positioning locking piece 37 of the clip 1 fitted to the cutaway groove portion 6 as will be described later (see FIG. 24).

Further, between each side wall portion 5B of the pedestal portion 5 and each positioning boss 11, and at each corner of four corners of the pedestal portion 5 when seen horizontally, a reinforcing rib 13 is provided in an upright posture to a height substantially equal to the height of the pedestal portion 5. Further, on the outer side surface portion of each positioning boss portion 11, a reinforcing rib 14 is provided in an upright posture to a height substantially equal to the height of the positioning boss portion 11. The respective reinforcing ribs 13, 14 are provided for the purpose of enhancing the strength of the pedestal portion 5 and each positioning boss portion 11.

At the edge portion (at the left edge portion in FIG. 2) of the tool hole 8 penetratively formed in the base end portion 4 opposing to the inlet portion of the cutaway groove portion 6, a rib portion 16 having a trapezoidal shape when seen from front is provided in an upright posture to the height opposing to a convex portion 25 (see FIG. 10) formed on the lower end portion of the clip 1 when the clip 1 is assembled to the pedestal portion 5. Further, an extending portion 17 which is elastically deformable in the downward direction extends from the upper end portion of the rib portion 16 to a position substantially vertically slightly inward from the inlet portion of the cutaway groove portion 6.

Next, a schematic structure of the clip 1 will be described based on FIGS. 1, 9 to 18.

Figure 9:
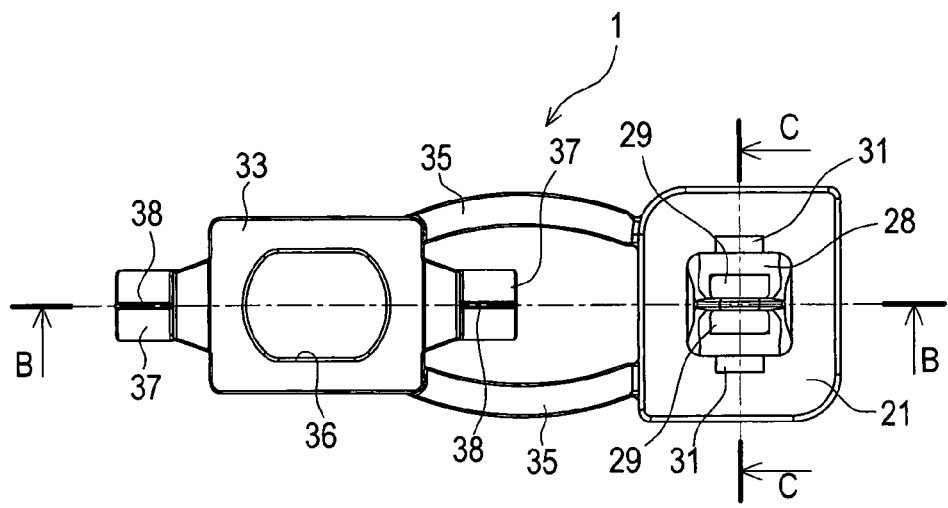
FIG. 9 is a plan view showing a state before fitting a seat plate member of the clip 1 into a fitting head portion.
Figure 10:
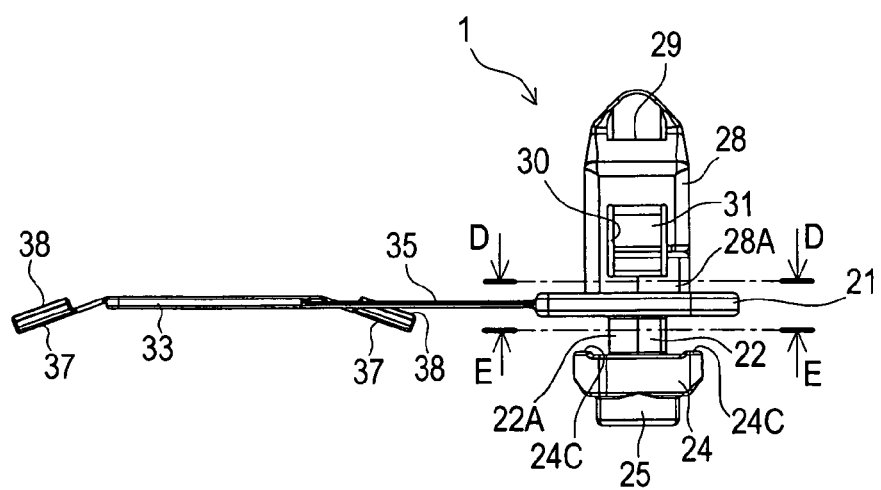
FIG. 10 is a front view showing a state before fitting a seat plate member of the clip into a fitting head portion.
Figure 11:
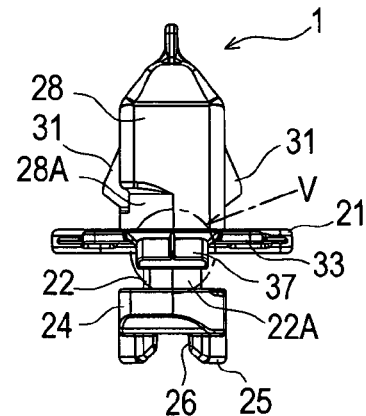
FIG. 11 is a left side view showing a state before fitting a seat plate member of the clip into a fitting head portion.
Figure 12:
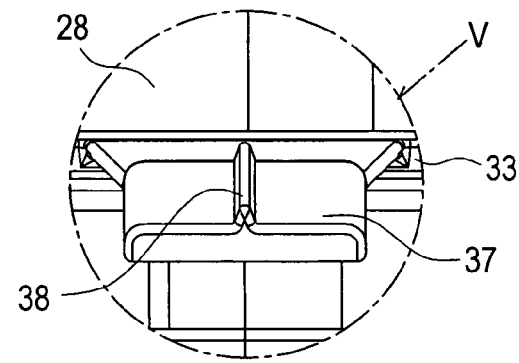
FIG. 12 is an enlarged view of the section V in FIG. 11.
Figure 13:
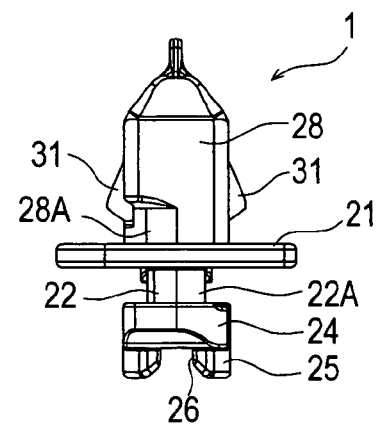
FIG. 13 is a right side view showing a state before fitting a seat plate member of the clip into a fitting head portion.
Figure 14:
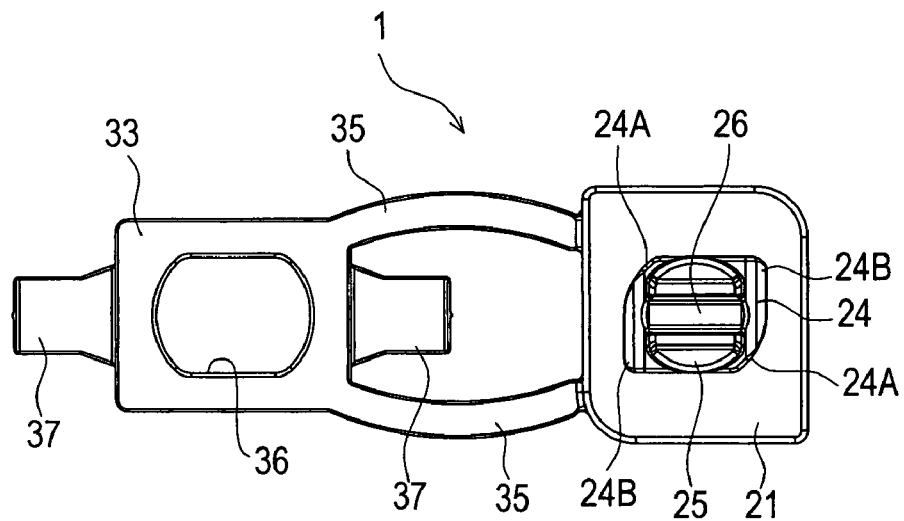
FIG. 14 is a bottom view showing a state before fitting a seat plate member of the clip into a fitting head portion.
Figure 15:
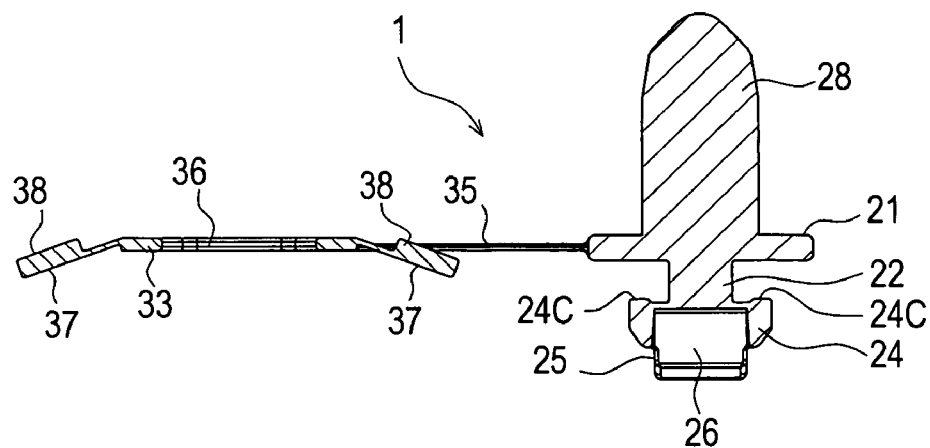
FIG. 15 is a cross-sectional view taken along the arrow B-B of FIG. 9.
Figure 16:
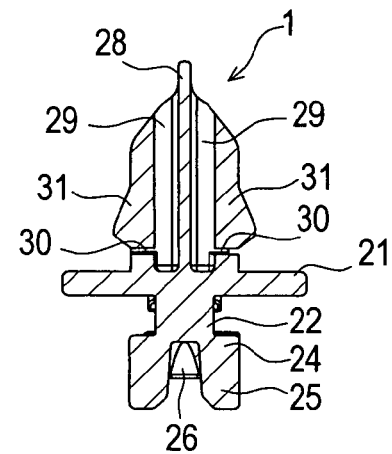
FIG. 16 is a cross-sectional view taken along the arrow C-C of FIG. 9.
Figure 17:
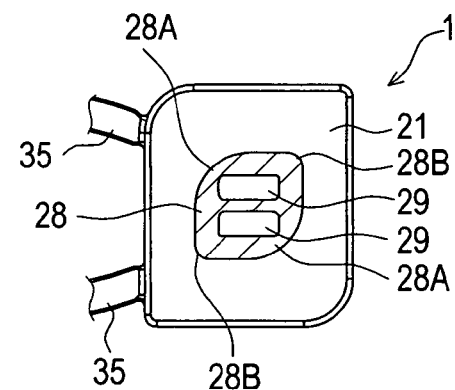
FIG. 17 is a cross-sectional view taken along the arrow D-D of FIG. 10.
Figure 18:
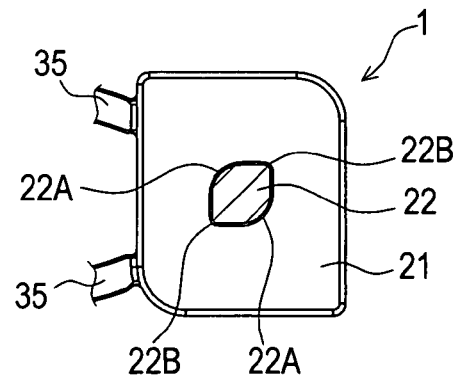
FIG. 18 is a cross-sectional view taken along the arrow E-E of FIG. 10.

FIG. 9 is a plan view showing a state before fitting a seat plate member 33 of the clip 1 into a fitting head portion 28. FIG. 10 is a front view showing a state before fitting a seat plate member 33 of the clip 1 into a fitting head portion 28. FIG. 11 is a left side view showing a state before fitting a seat plate member 33 of the clip 1 into a fitting head portion 28. FIG. 12 is an enlarged view of the section V in FIG. 11. FIG. 13 is a right side view showing a state before fitting a seat plate member 33 of the clip 1 into a fitting head portion 28. FIG. 14 is a bottom view showing a state before fitting a seat plate member 33 of the clip 1 into a fitting head portion 28. FIG. 15 is a cross-sectional view taken along the arrow B-B of FIG. 9. FIG. 16 is a cross-sectional view taken along the arrow C-C of FIG. 9. FIG. 17 is a cross-sectional view taken along the arrow D-D of FIG. 10. FIG. 18 is a cross-sectional view taken along the arrow E-E of FIG. 10.

Here, the clip 1 is integrally molded from one of various resins, for example, polypropylene.

Figure 25:
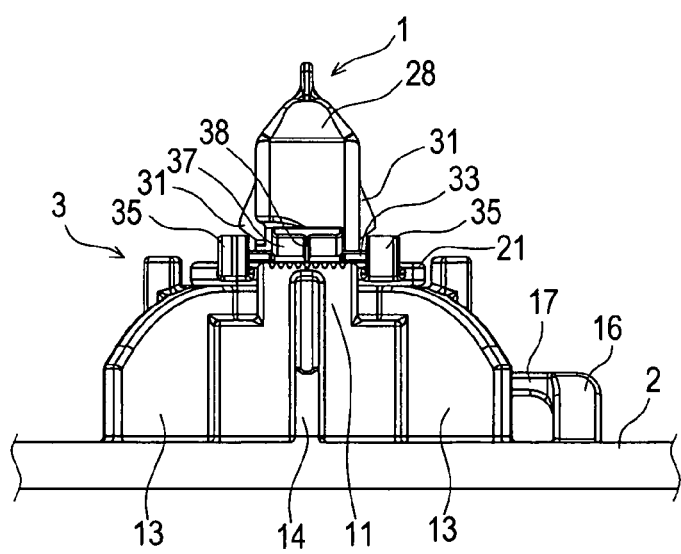
FIG. 25 is a front view for illustrating a state where the clip has been assembled to the assembling portion.

As shown in FIGS. 1, and 9 to 18, the clip 1 has a flat plate portion 21 having a substantially rectangular shape when seen from above of which the bottom surface (the lower end surface in FIG. 10) will be brought into contact with the upper surface portion of the upper wall 5A of the pedestal portion 5 (see FIG. 25 and the like). From the midportion on the bottom surface of the flat plane portion 21, a boss portion 22 is vertically extended downward. The height of the boss portion 22 is substantially equal to the thickness of the upper wall 5A (see FIG. 28).

Further, as shown in FIG. 18, the cross section of the boss portion 22 vertical to its axial direction assumes a substantially square shape having sides substantially equal to the width of the cutaway groove portion 6 formed in the upper wall 5A as a whole. A pair of opposing corners of the square creates a circular arc 22A having a diameter substantially equal to the width of the cutaway groove portion 6, whereas the other pair of opposing corners thereof creates a corner portion 22B at substantially right angle.

At the lower end portion of the boss 22 (the lower end portion in FIG. 10), a flat plate-like flange portion 24 (see FIG. 10 and the like) having a substantially rectangular shape (in this embodiment, approximately 1.5 mm to 4 mm in thickness) is formed to protrude outward around the lower end portion of said boss portion 22 into a predetermined length (in this embodiment, approximately 1.5 mm to 3 mm).

Figure 29:
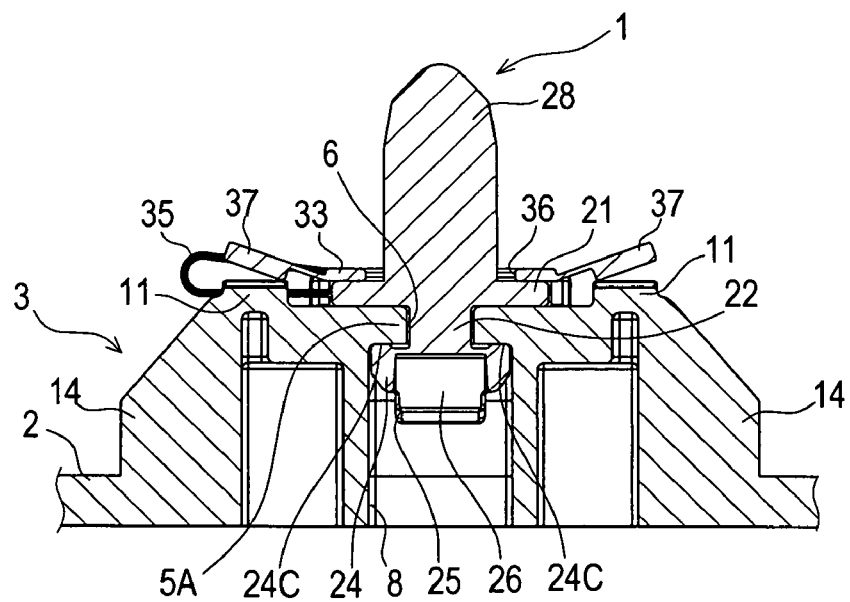
FIG. 29 is a cross-sectional view taken along the line H-H of FIG. 24.

Further, as shown in FIG. 14, the flange portion 24 is formed into a substantially square shape as a whole when seen from above having sides each of which is in a width substantially equal to an inner width of the pedestal portion 5 (see FIG. 29). A pair of opposing corners of the square creates a circular arc 24A having a diameter substantially equal to the inner width of the pedestal portion 5, whereas the other pair of opposing corners thereof creates a corner portion 24B at substantially right angle.

Figure 38:
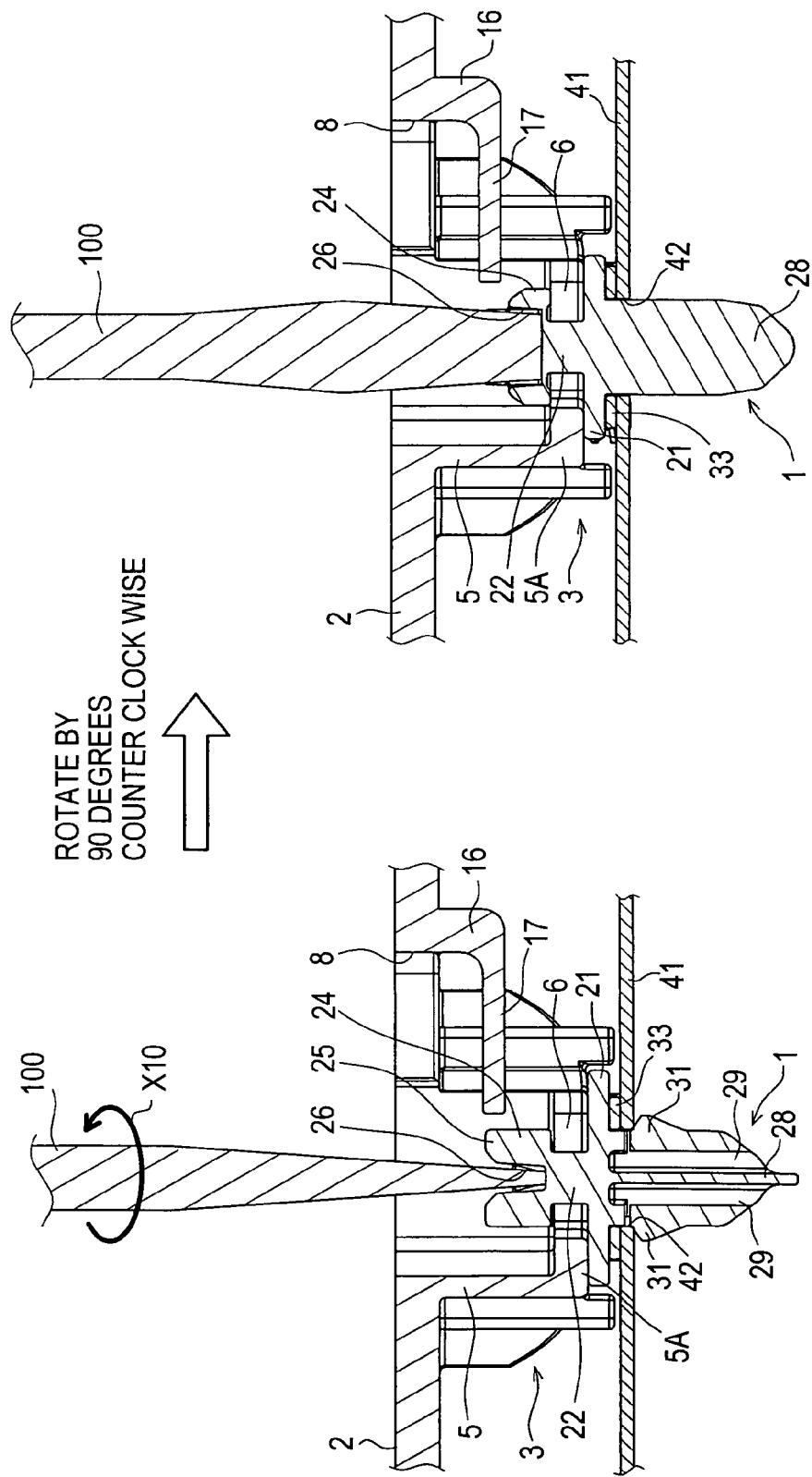
FIG. 38 is a diagram for illustrating a method of releasing the locked state between the clip and the attachment receiving member by means of a tool.

Due to this arrangement, when the boss portion 22 of the clip 1 is fitted into the cutaway groove portion 6 of the pedestal portion 5 and said clip 1 is rotated in a state where it is attached to the pedestal portion 5, the clip 1 can be rotated only in a direction in an arrow X10 in FIG. 38, that is, only in a direction along which a tool 100 is rotated counterclockwise, because of the axially vertical cross sectional shape of the boss portion 22 an the flange portion 24. Further, the boss portion 22 and the flange portion 24 are structured to be capable of rotating only by 90 degrees counterclockwise.

Figure 28:
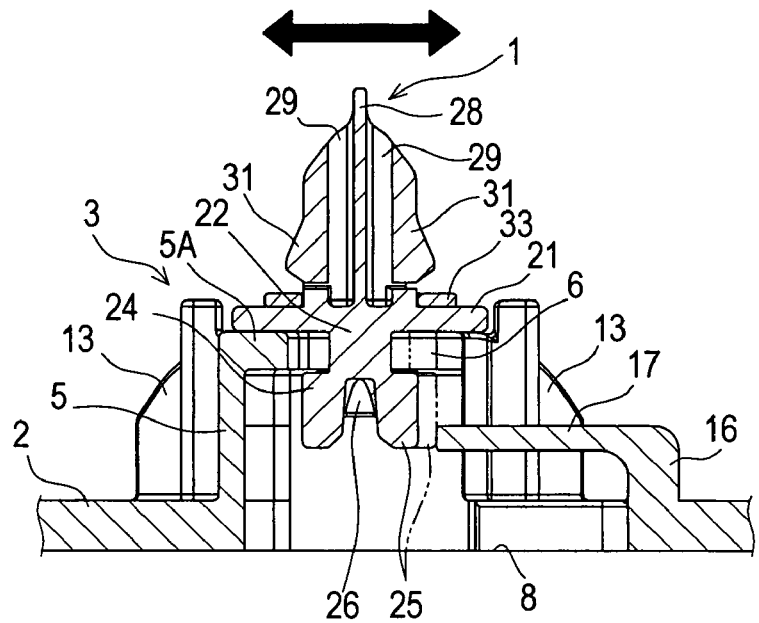
FIG. 28 is a cross-sectional view taken along the line G-G of FIG. 24.

At the left and right (left and right portions in FIG. 10) opposite outer edge portions along a longitudinal direction of the cutaway groove portion 6 and opposing to the bottom surface of the flat plate portion 21 of the flange portion 24, each contact rib portion 24C is provided in an upright posture to such a predetermined height (in this embodiment, in a height of approximately 0.3 mm to 0.5 mm). Due to this structure, when the boss portion 22 is slipped into the cutaway groove portion 6 of the pedestal portion 5, the upper wall 5A is pinched between the bottom surface of the flat plate portion 21 and the upper end surface portion of each contact rib portion 24C so that the clip 1 is assembled to the pedestal portion 5 and the clip 1 is made slidable along the cutaway groove portion 6 (FIG. 28).

On the midportion of the lower end of the flange portion 24 (lower end portion in FIG. 10), a convex portion 25 in a substantially oval shape in cross section having a longer diameter substantially equal to the width of said flange portion 24 is protruded to a predetermined height (in this embodiment, approximately 1.5 mm to 3 mm). Further, the convex portion 25 is arranged in such a manner that the longer diameter direction substantially coincides with the longitudinal direction of the cutaway groove portion 6.

Further, the midportion of the lower end of the convex portion 25 is cut away over its entire width along the shorter diameter direction to be recessed into a depth substantially reaching the upper end portion of the flange portion 24, so as to create a recessed portion 26 to which a top end portion of the tool 100 is fitted as will be described later (see FIG. 38).

At the midportion on the upper surface of the flat plate portion 21, a fitting head portion 28 to be fitted to a long hole (a first long hole) 42 having a substantially rectangular shape of an attachment receiving member 41 as will be described later is provided in an upright posture. The fitting head portion 28 is formed into a substantially square shape when seen from above as a whole having sides of the same width as of the shorter side of the long hole 42 (see FIG. 9). In addition, the left and right side surfaces (left and right side surface portions in FIG. 9) of the fitting head portion 28 are placed along the longitudinal direction of the cutaway groove portion 6 when the clip 1 is attached to the pedestal portion 5. Further, the upper end portion of the fitting head portion 28 is formed into a tapered shape when seen from side (see FIG. 11).

Further, as shown in FIGS. 9 and 16, hole portions 29, 29 in a rectangular shape long in left and right directions in a horizontal cross section are formed in the upper end surface portion of the fitting head portion 28 to a depth reaching the upper surface portion of the flat plate portion 21 in such a manner that the respective hole portions 29, 29 are placed along the longitudinal direction of the cutaway groove portion 6 when the clip is attached to the pedestal portion 5. On the frontward and rearward (upward and downward in FIG. 9) side surface portions of the fitting head portion 28 opposing to the respective hole portions 29, 29, through holes 30, 30 each having a substantially longitudinally long rectangular shape are formed. Then, a pair of elastic locking pieces 31 which is elastically deformable inward is provided to extend downward from the upper edge portions of the through holes 30, 30. The respective elastic locking pieces 31, 31 are formed into a substantially longitudinally long rectangular shape when seen from front, and as shown in FIG. 16, the lower end portion thereof protrudes into a substantially triangular shape in a side cross section. Further, as will be described later, the height of the respective elastic locking pieces 31, 31 from the lower end portion to the flat plate portion 21 is arranged to be slightly smaller than the sum of the thickness of a seat plate member 33 and the thickness of the attachment receiving member 41 (see FIG. 36). Due to this arrangement, when the clip 1 is fitted into the long hole 42 of the attachment receiving member 41 as will be described later, the respective longer side portions of said long hole 42 are assuredly brought into contact with the lower end portions of the respective elastic locking pieces 31, 31 which are inclined obliquely inward, so that said respective elastic locking pieces 31, 31 are elastically locked with the longer side portions of the long hole 42 (see FIG. 36).

Further, the fitting head portion 28 is formed into a substantially square shape as a whole in cross section axially vertical from each protruding portion of the respective elastic locking pieces 31,31 protruding outward to the to flat plate portion 21. Each side of the square has a width substantially same as of the shorter side of the long hole 42 of the attachment receiving member 41. A pair of opposing corners of the square creates a circular arc 28A having a diameter substantially equal to the width of the shorter side of the long hole 42, whereas the other pair of opposing corners thereof creates a corner portion 28B at substantially right angle.

Due to this arrangement, as will be described later, when the clip 1 is fitted into the long hole 42 of the attachment receiving member 41 and said clip 1 is rotated while it is attached to the pedestal portion 5, the clip 1 can be rotated only in a direction shown with an arrow X10 in FIG. 38, that is, only in a direction along which the tool 100 is rotated counterclockwise (see FIG. 38), because of the axially vertical cross sectional shape of the base end portion of the fitting head portion 28. Further, the base end portion of the fitting head portion 28 is structured to be capable of rotating only by 90 degrees counterclockwise within the long hole 42.

Further, when the clip 1 is attached to the pedestal portion 5, the seat plate member 33 in a horizontally long square shape when seen from top is connected to one of the side surface portions (at the right side surface portion in FIG. 9) of the flat plate portion 21 in a direction at substantially right angle relative to the longitudinal direction of the cutaway groove portion 6 by means of a pair of connecting portions 35 each in an elongated thin plate-like shape. At the midportion of the seat plate member 33, a long hole (second long hole) 36 in a substantially horizontally long square shape having a width substantially equal to the width of the fitting head portion 28 is penetratively formed in such a manner that its longer sides are parallel to the side surface portions of said fitting head portion 28 formed with the respective elastic locking pieces 31, 31. Further, the length of each of a pair of elongated thin plate-like connecting portions 35 is arranged in such a manner that the long hole 36 of the seat plate member 33 can be inserted to the fitting head portion 28 as will be described later (see FIG. 19).

Further, a pair of positioning locking pieces 37 is respectively extended from the midportions of the opposite side edges in the longitudinal direction of the seat plate member 33 obliquely downward (obliquely downward in FIG. 10). Each positioning locking piece has a width smaller than said respective side edge portion and is structured to be elastically deformable upward and downward. Each positioning locking piece 37 is extended outward to a predetermined length so that it opposes to the upper end surface portion of each positioning boss portion 11 when the clip 1 is assembled to the pedestal portion 5 as will be described later (see FIG. 26).

Further, each positioning locking piece 37 is formed into a thin thickness at its side of the base end portion so that it elastically deforms upward (upward in FIG. 10) with a small pressing force. Further, at the midportion on the upper surface at the top end side of each positioning locking piece 37, a positioning rib portion 38 to be fitted into a positioning groove 10 formed on the upper end surface portion of each positioning boss portion 11 as will be described later is provided into an upright posture to a predetermined height (in this embodiment, to a height of approximately 0.4 mm to 0.5 mm) along a longitudinal direction of the seat plate member 33 to a predetermined length (in this embodiment, to a length substantially equal to the length of the positioning groove 10) (see FIG. 37).

Subsequently, a method for assembling thus-structure clip 1 to the assembling portion 3 of the assembling member 2 will be described based on FIGS. 19 to 29.

Figure 19:
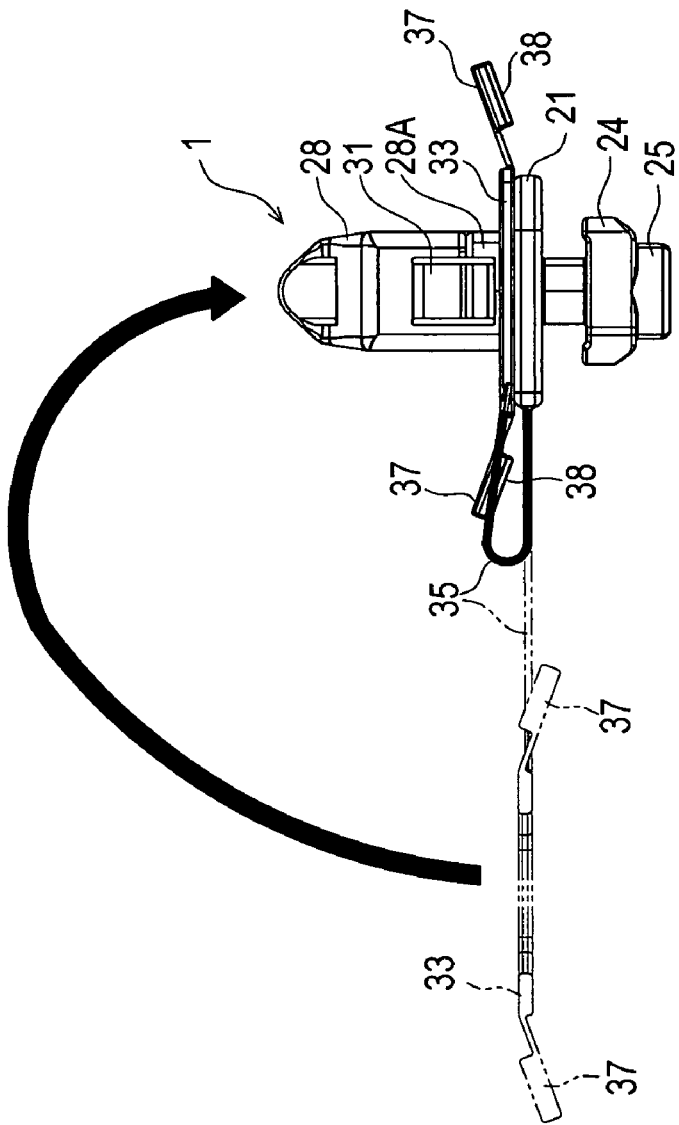
FIG. 19 is a front view showing a state where the seat plate member of the clip is fitted to the fitting head portion.
Figure 20:
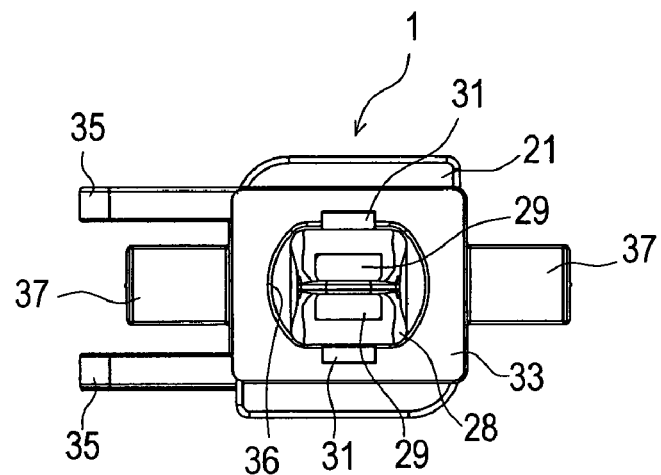
FIG. 20 is a plan view showing a state where the seat plate member of the clip is fitted to the fitting head portion.
Figure 21:
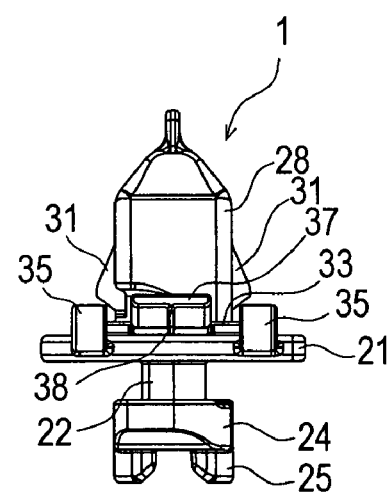
FIG. 21 is a left side view showing a state where the seat plate member of the clip is fitted to the fitting head portion.
Figure 22:
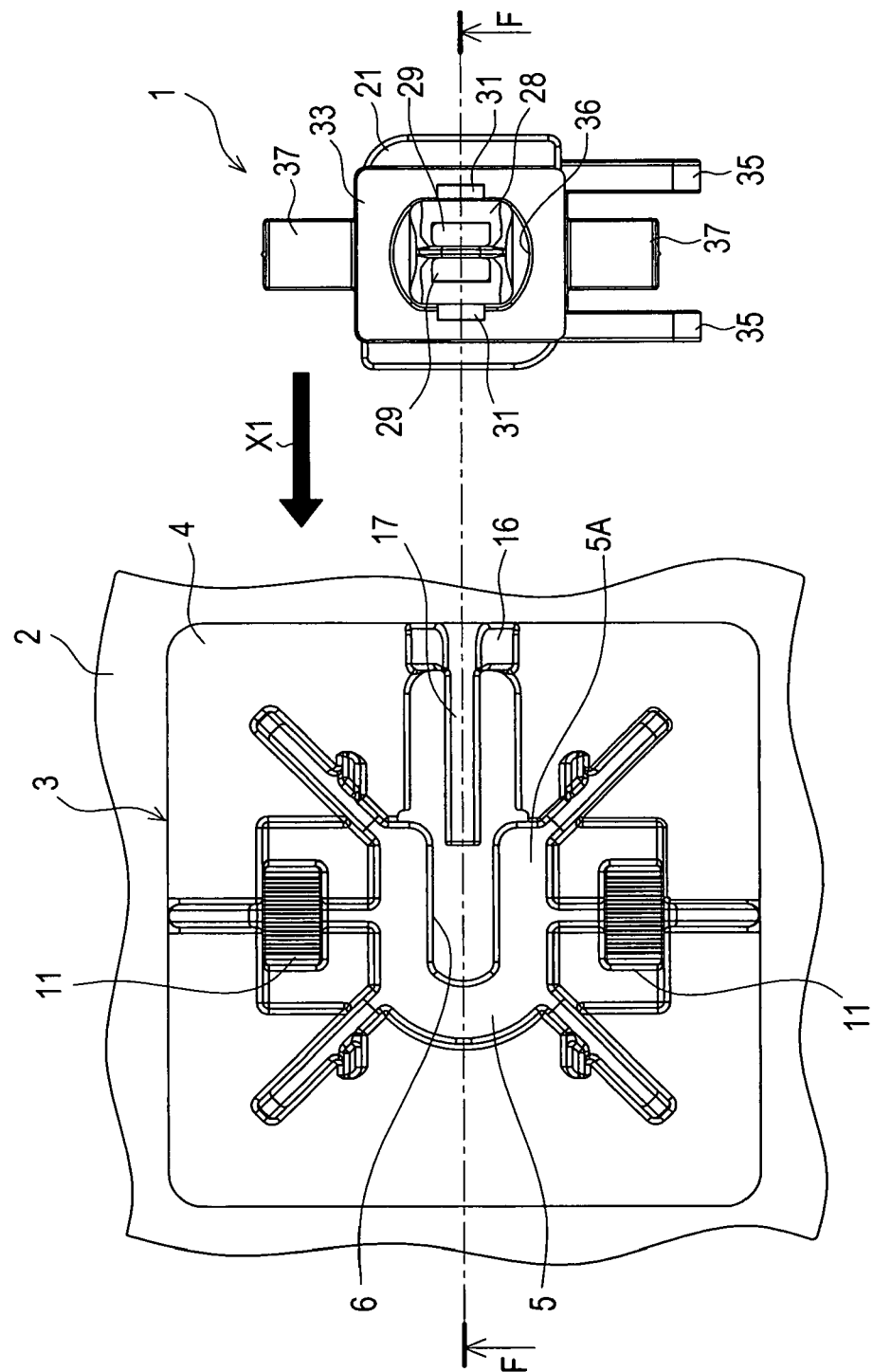
FIG. 22 is a plan view for illustrating a process of assembling the clip to the assembling portion.
Figure 23:
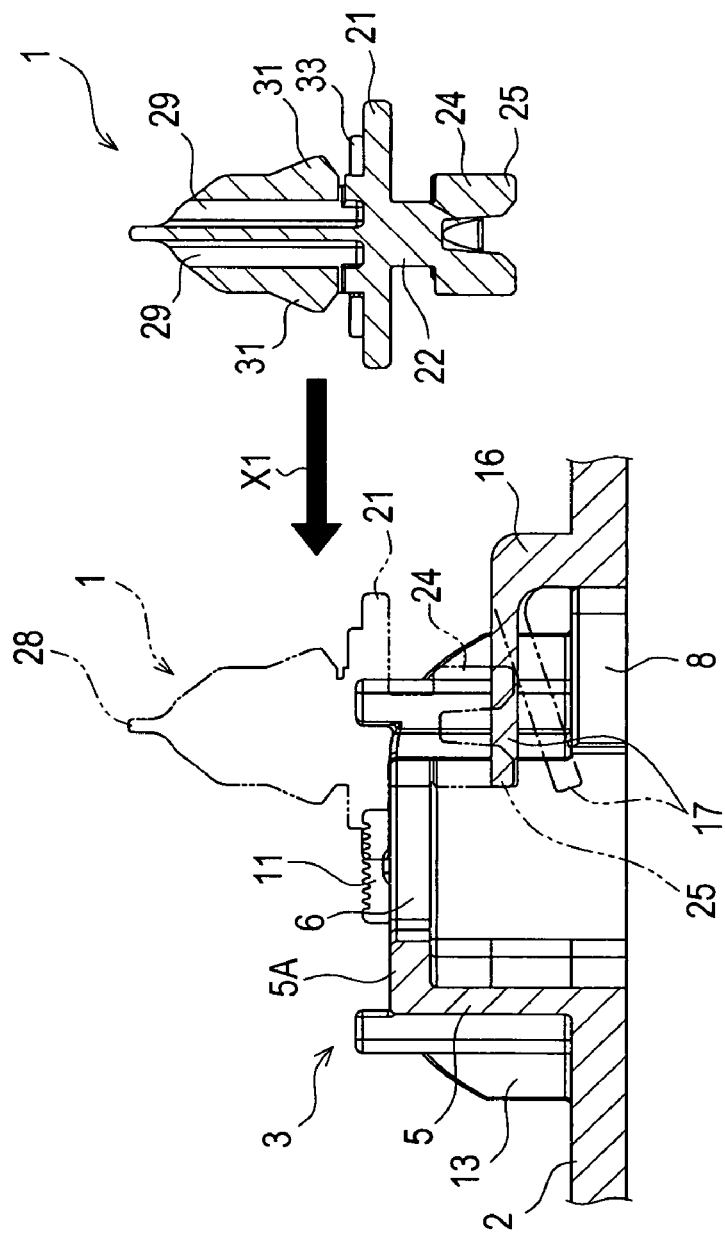
FIG. 23 is a cross-sectional view taken along the line F-F of FIG. 22 in the course of assembly.
Figure 24:
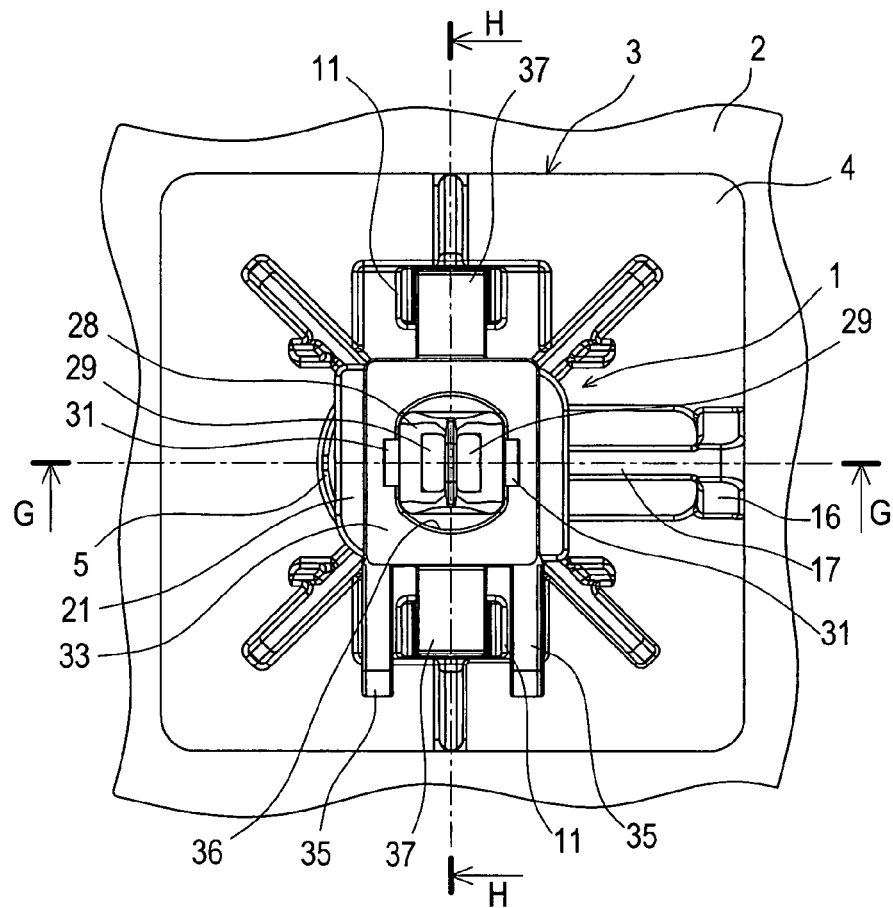
FIG. 24 is a plan view for illustrating a state where the clip has been assembled to the assembling portion.
Figure 26:
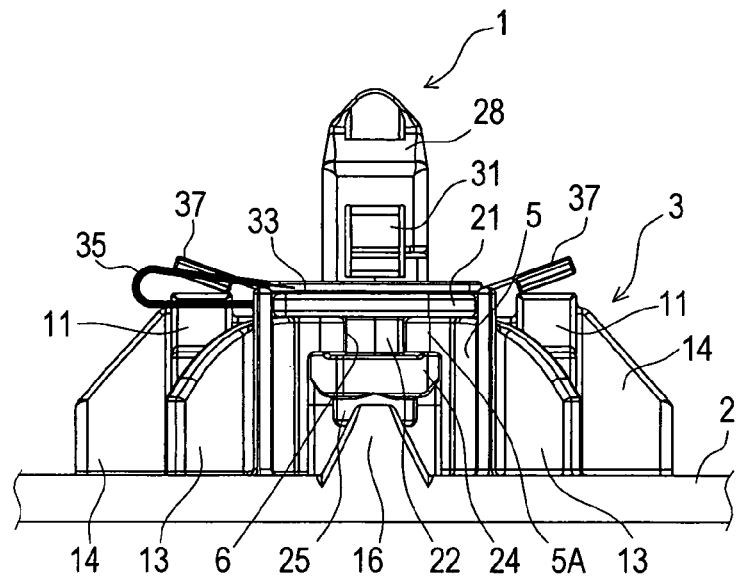
FIG. 26 is a right side view for illustrating a state where the clip has been assembled to the assembling portion.
Figure 27:
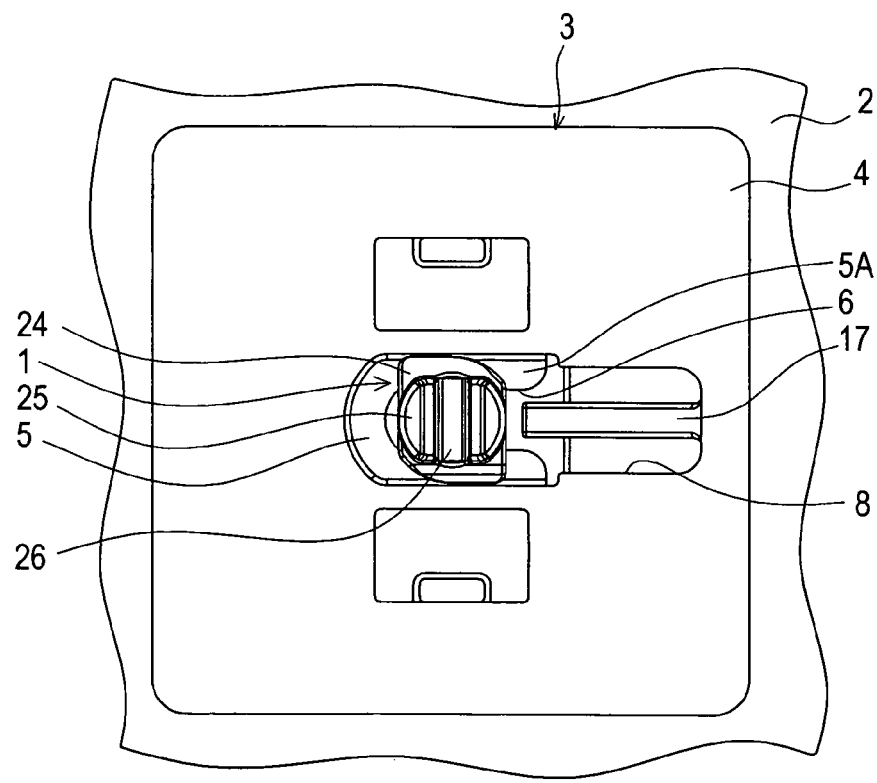
FIG. 27 is a bottom view for illustrating a state where the clip has been assembled to the assembling portion.

FIG. 19 is a front view showing a state where the seat plate member 33 of the clip 1 is fitted to the fitting head portion 28. FIG. 20 is a plan view showing a state where the seat plate member 33 of the clip 1 is fitted to the fitting head portion 28. FIG. 21 is a left side view showing a state where the seat plate member 33 of the clip 1 is fitted to the fitting head portion 28. FIG. 22 is a plan view for illustrating a process of assembling the clip 1 to the assembling portion 3. FIG. 23 is a cross-sectional view taken along the line F-F of FIG. 22 in the course of assembly. FIG. 24 is a plan view for illustrating a state where the clip 1 has been assembled to the assembling portion 3. FIG. 25 is a front view for illustrating a state where the clip 1 has been assembled to the assembling portion 3. FIG. 26 is a right side view for illustrating a state where the clip 1 has been assembled to the assembling portion 3. FIG. 27 is a bottom view for illustrating a state where the clip 1 has been assembled to the assembling portion 3. FIG. 28 is a cross-sectional view taken along the line G-G of FIG. 24. FIG. 29 is a cross-sectional view taken along the line H-H of FIG. 24.

As shown in FIGS. 19 to 21, first of all, the long hole 36 of the seat plate member 33 of the clip 1 is fitted to the fitting head portion 28 from the upper end portion of the fitting head portion 28, and is pressed toward the base end portion while contacting the long hole 36 with the side surface portions of the fitting head portion 28. Then, the respective elastic locking pieces 31, 31 are pushed inward by the respective longer side portions of the long hole 36 of the seat plate member 33, and then, they are further pushed toward the base end portion to bring the seat plate member 33 into contact with the flat plate portion 21.

As a result, since the width of the long hole 36 penetratively formed in the seat plate member 33 is formed to be substantially equal to the width of the fitting head portion 28, each longer side portion of the long hole 36 of the seat plate member 33 is kept between the flat plate portion 21 and the lower end portion of each elastic locking piece 31 against the elastic force of each connecting portion 35. Further, each positioning locking piece 37 is extended obliquely upward (obliquely upward in FIG. 19) from the midportions of the opposite edge portions in a longitudinal direction of the seat plate member 33 and is formed to be elastically deformable downward with a small pressing force (downward in FIG. 19). When the clip 1 is assembled to the pedestal portion 5 as will be described later, each positioning locking piece 37 opposes to the upper end surface portion of each positioning boss portion 11 (see FIG. 29). Further, each positioning rib portion 38 is formed to be extended vertically downward at the midportion on the lower surface at the top end side of each positioning locking piece 37. When the clip 1 is assembled to the base end portion 5 as will be described later, each positioning rib portion 38 can be fitted to the positioning groove 10 formed on the upper end surface portion of each positioning boss portion 11 (see FIG. 29).

Subsequently, as shown in FIGS. 22 and 23, the clip 1 with its seat plate member 33 held between the lower end portion of each elastic locking piece 31 and the flat plate portion 21 is moved in the direction of the arrow X1 in such a manner that the respective elastic locking pieces 31, 31 are placed along the longitudinal direction of the cutaway groove portion 6. As a result of this, the longitudinal direction of the seat plate member 33 of the clip 1 is at substantially right angle relative to the longitudinal direction of the cutaway groove portion 6, and the respective positioning locking pieces 37, 37 are moved to the positions each opposing to the positioning boss portion 11.

Then, the convex portion 25 formed on the lower end portion of the flange portion 24 of the clip 1 is brought into contact with the extending portion 17 provided to the base end portion 4. While depressing said extending portion 17 downward, the clip 1 is moved in the direction along the arrow X1 with the lower end surface of the flat plate portion 21 of the clip 1 brought into contact with the upper end surface of the upper wall 5A of the pedestal portion 5, so that the boss portion 22 is slipped into the cutaway groove portion 6 of the pedestal portion 5.

Further, as shown in FIGS. 24 to 29, as the clip 1 is further pushed in the direction of the arrow X1, the convex portion 25 is distanced from the top end portion of the extending portion 17, and the upper wall 5A is pinched between the bottom surface of the flat plate portion 21 and the respective contact rib portion 24C of the flange portion 24. As a result, the clip 1 becomes slidable along the cutaway groove portion 6. Since the convex portion 25 of the clip 1 opposes to the top end portion of said extending portion 17, when the boss portion 22 moves to reach the inlet portion of the cutaway groove portion 6, said convex portion 25 comes into contact with the top end portion of the extending portion 17 (see FIG. 28). As a result, the clip 1 is prevented from slipping off the pedestal portion 5. In this manner, the clip 1 can be always kept slidable along the cutaway groove portion 6, and simultaneously, the clip 1 can be always integrally handled with the assembling portion 3 of the attachment member 2 to which the clip 1 is assembled.

Further, as shown in FIGS. 24, 25 and 28, the clip 1 is formed with a clearance in a predetermined width between the boss portion 22 and depth side surface portion of the cutaway groove portion 6 and between the boss portion 22 and the top end portion of the extending portion 17 respectively, when the positioning rib portion 38 of the respective positioning locking pieces 37, 37 extended outward from the opposite edge portions of the seat plate member 33 at right angle relative to the longitudinal direction of the cutaway groove portion 6 opposes to the middle position on the upper end surface of each positioning boss portion 11. As a result, the clip 1 is configured to be slidable by a predetermined width (in this embodiment, a width that enables the positioning rib portion 38 to oppose to either one of the positioning grooves 10) along the cutaway groove portion 6.

Here, the long hole of the attachment receiving member 41 which is a metal plate (body) to constitute an automobile body and to which the clip 1 is locked will be described based on FIG. 30.

Figure 30A:
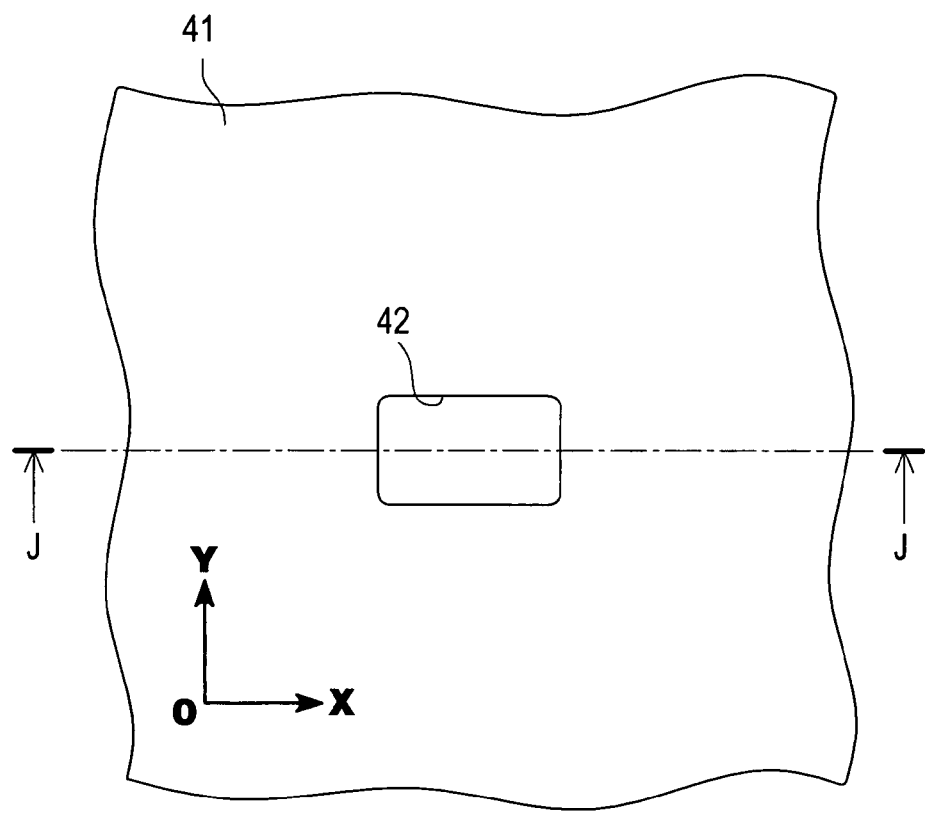
FIG. 30A is a diagram showing a plan view of the long hole of the attachment receiving member to which the clip is locked.
Figure 30B:
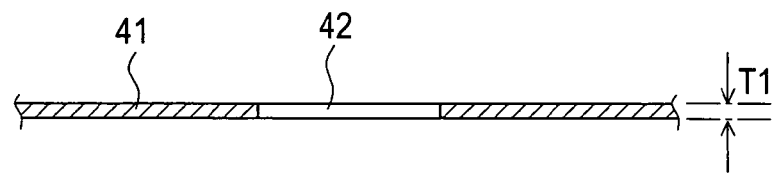
FIG. 30B is a cross-sectional view of the long hole taken along the arrow J-J of FIG. 30A.

FIG. 30 is a diagram showing the long hole 42 of the attachment receiving member 41 to which the clip 1 is locked, where FIG. 30A is a plan view and FIG. 30B is a cross-sectional view taken along the arrow J-J of FIG. 30A.

As shown in FIG. 30A and FIG. 30B, the long hole 42 in a substantially horizontal long square shape to which the clip 1 is locked is penetratively formed in the attachment receiving member 41 having a thickness of T1 (in this embodiment, T1 is approximately 0.8 mm to 2 mm). The long hole 42 is penetratively formed in such a manner that its longitudinal direction (X direction in FIG. 30A) is oriented along the direction at substantially right angle relative to the longitudinal direction of the cutaway groove portion 6 formed on the upper wall 5A of the pedestal portion 5 of the attachment member 2. The width of the long hole 42 in its longitudinal direction (X direction in FIG. 30A) is arranged to be larger than the distance between the outward protruding end portions of the elastic locking pieces 31, 31 of the clip 1. The width is also arranged so that, when the clip 1 is rotated by 90 degrees counterclockwise and is withdrawn from said long hole 42 as will be described later, the respective elastic locking pieces 31, 31 can pass through said long hole 42 (see FIG. 39). In this manner, the positional deviation in the X direction between the clip 1 assembled to the assembling portion 3 of the attachment member 2 and the attachment receiving member 41 can be absorbed.

Further, the width of the long hole 42 in a direction at right angle relative to its longitudinal direction, that is, the width in the Y direction is arranged to be substantially equal to the width of the fitting head portion 28 of the clip 1. As will be described later, the respective elastic locking pieces 31, 31 of the clip 1 are elastically locked with each longer side portion of the long hole 42 (see FIG. 35).

Next, a method of attaching the attachment member 2 to the attachment receiving member 41 which is a metal plate (body) to constitute an automobile body via thus-structured clip 1 will be described based on FIGS. 31 to 37.

Figure 31:
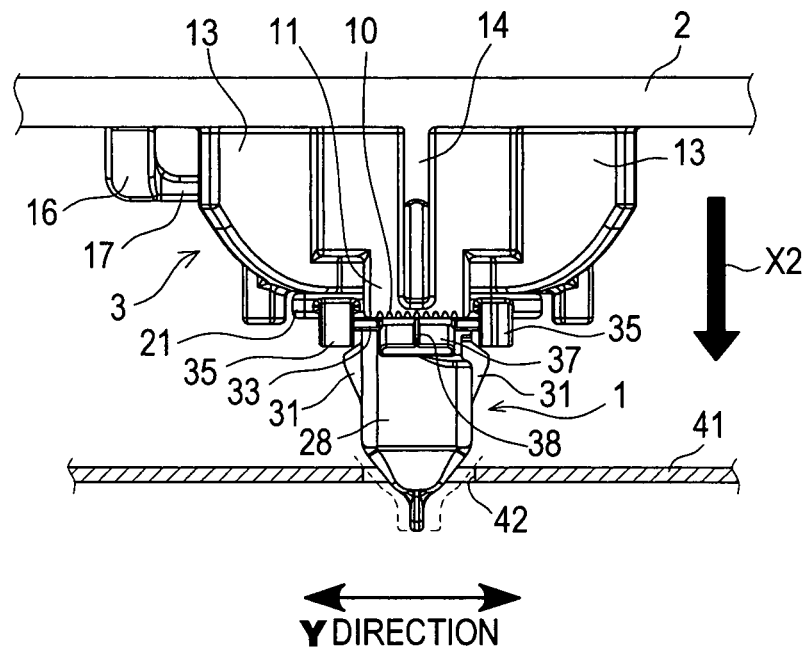
FIG. 31 is a right side view for illustrating a process of attaching the clip to the attachment receiving member.
Figure 32:
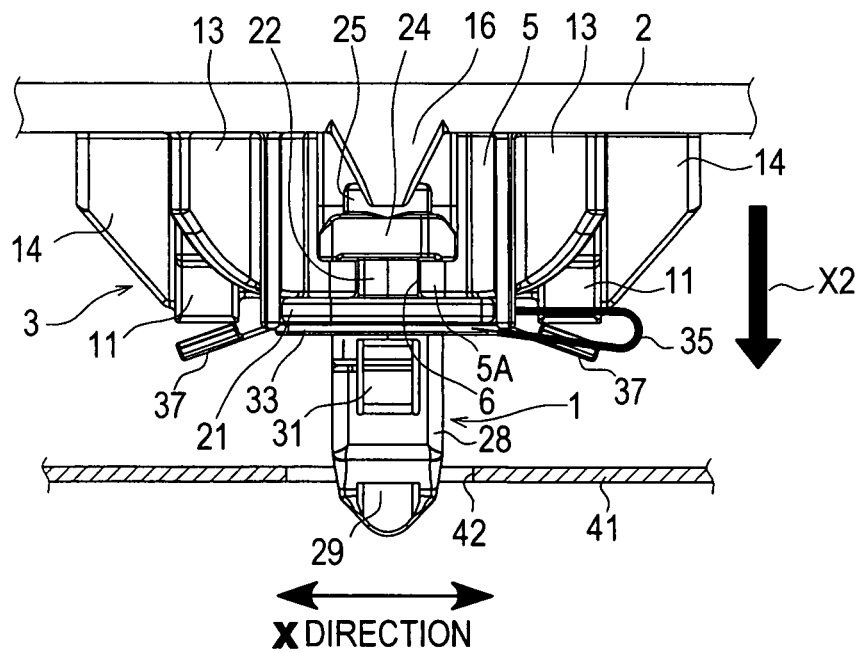
FIG. 32 is a front view for illustrating a process of attaching the clip to the attachment receiving member.
Figure 33:
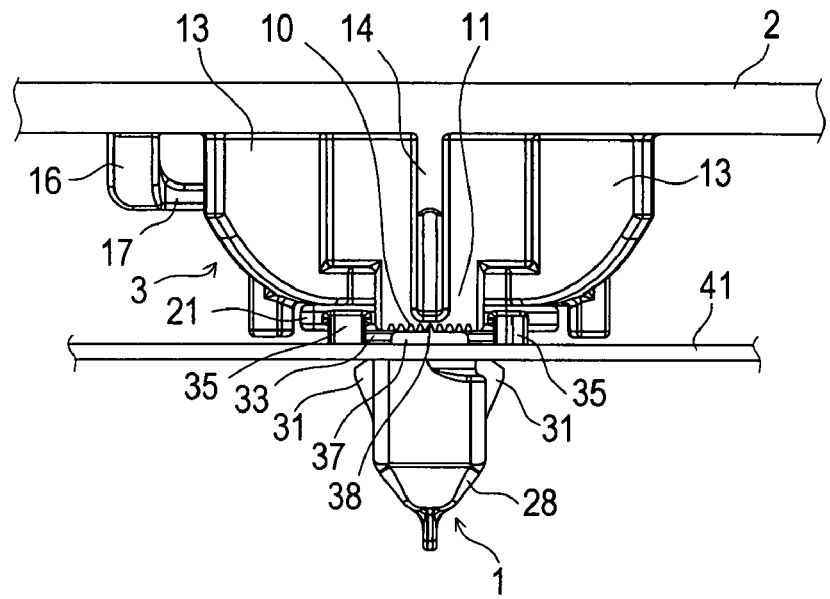
FIG. 33 is a right side view for illustrating a state where the clip is locked with the attachment receiving member.
Figure 34:
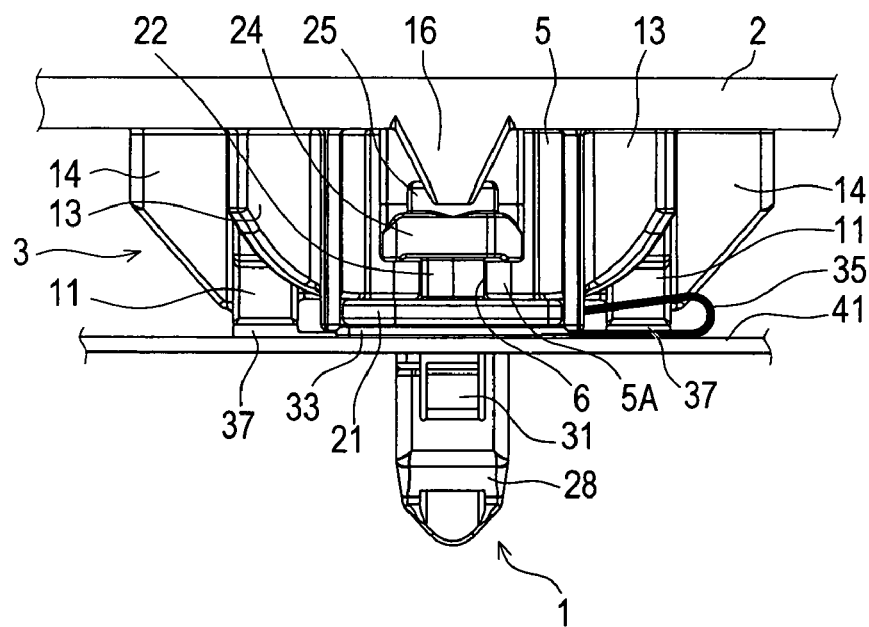
FIG. 34 is a front view for illustrating a state where the clip is locked with the attachment receiving member.
Figure 35:
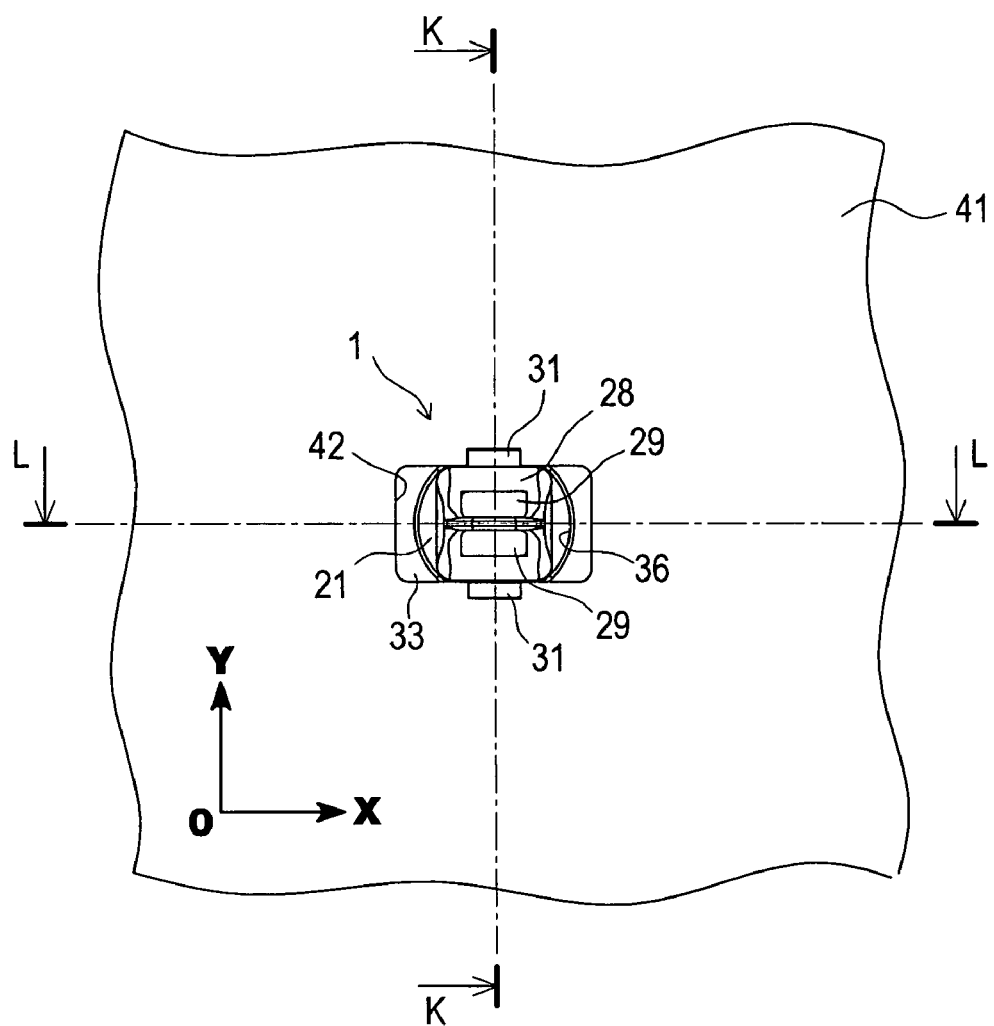
FIG. 35 is a bottom view for illustrating a state where the clip is locked with the attachment receiving member.
Figure 36:
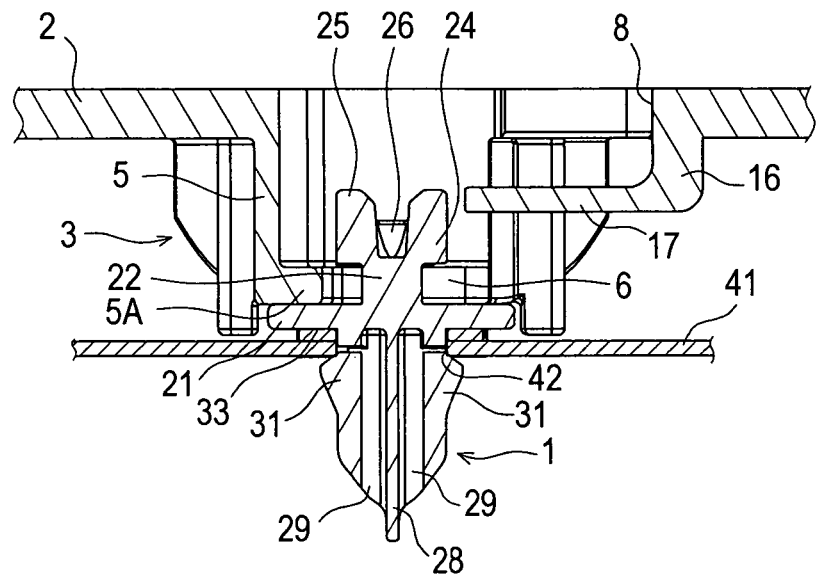
FIG. 36 is a cross-sectional view taken along the line K-K of FIG. 35.
Figure 37:
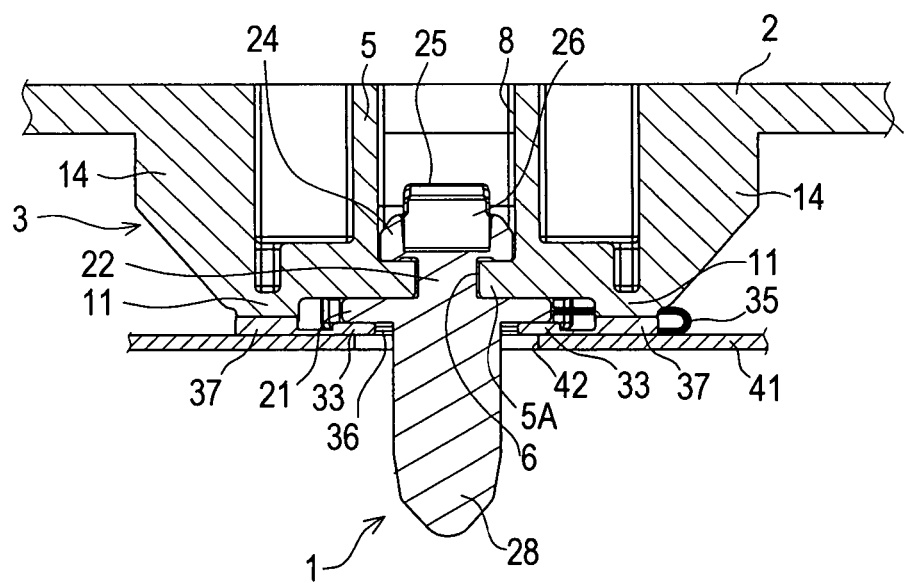
FIG. 37 is a cross-sectional view taken along the line L-L of FIG. 35.

FIG. 31 is a right side view for illustrating a process of attaching the clip 1 to the attachment receiving member 41. FIG. 32 is a front view for illustrating a process of attaching the clip 1 to the attachment receiving member 41. FIG. 33 is a right side view for illustrating a state where the clip 1 is locked with the attachment receiving member 41. FIG. 34 is a front view for illustrating a state where the clip 1 is locked with the attachment receiving member 41. FIG. 35 is a bottom view for illustrating a state where the clip 1 is locked with the attachment receiving member 41. FIG. 36 is a cross-sectional view taken along the line K-K of FIG. 35. FIG. 37 is a cross-sectional view taken along the line L-L of FIG. 35.

As shown in FIGS. 31 and 32, first of all, the top end portion of the fitting head portion 28 of the clip 1 assembled to the assembling portion 3 of the attachment member 2 is inserted into the long hole 42 of the attachment receiving member 41, and is depressed downward (in the direction of the arrow X2) so as to be inserted through the long hole 42. Since the long hole 42 is penetratively formed so that its longitudinal direction (X direction in FIG. 30A) is placed along the direction at substantially right angle relative to the longitudinal direction of the cutaway groove portion 6 formed on the upper wall 5A of the pedestal portion 5 of the attachment member 2, the clip 1 is inserted through the long hole 42 with its elastic locking pieces 31, 31 opposing to the respective longer side portions of the long hole 42. This insertion operation is continued until the seat plate member 33 of the clip 1 comes into contact with the attachment receiving member 41 and said seat plate member 33 comes into contact with the flat plate member 21.

Further, as shown in FIG. 31, the width of the long hole 42 in a direction at right angle relative to the longitudinal direction thereof, that is, the width in the Y direction, is substantially equal to the width of the fitting head portion 28 of the clip 1. Due to this structure, when the top end portion of the fitting head portion 28 is inserted into the long hole 42 of the attachment receiving member 41 and is depressed downward (in a direction of the arrow X2), if the fitting head portion 28 and the long hole 42 are deviated from each other in the Y direction, the clip 1 slides in the Y direction within the cutaway groove portion 6 along the inclined surface of the top end portion of the fitting head portion 28. Thus, the fitting head portion 28 is fitted into the long hole 42 while being positioned in the Y direction relative to said each long hole 42 of the attachment receiving member 41. As a result, the positional deviation in a direction at right angle (Y direction in FIG. 30) relative to the longitudinal direction of the long hole 42 between the clip 1 assembled to the assembling portion 3 of the attachment member 2 and the long hole 42 is absorbed. Thus, the fitting head portion 28 of the clip 1 can be fitted into the long hole 42.

Further, as shown in FIG. 32, the longitudinal width of the long hole 42 (width in the X direction in FIG. 30) is larger than the width of the fitting head portion 28. Therefore, the positional deviation in the longitudinal direction of the long hole 42 (X direction in FIG. 30) between the clip 1 assembled to the assembling portion 3 of the attachment member 2 and the long hole 42 can be absorbed.

Then, as the attachment member 2 is further depressed downward (in the direction of the arrow X2) from the state shown in FIGS. 31 and 32, the respective elastic locking pieces 31, 31 are brought into contact with the respective longer side portions of the long hole 42 and are elastically deformed inward so as to be pushed into the respective hole portions 29. As a result, the long hole 42 passes through the elastic locking pieces 31, 31 and is fitted to the base end portion of the fitting head portion 28, and the attachment receiving member 41 is brought into contact with the seat plate member 33, and in turn, said seat plate member 33 is brought into contact with the flat plate portion 21. At the same time, the respective elastic locking pieces 31, 31 again are elastically deformed outward, and each inclined surface inclined obliquely downward toward the flat plate portion 21 comes elastically into contact with each longer side portion of the long hole 42, so that the clip 1 is locked with the long hole 42 (see FIG. 36). This state is shown in FIGS. 33 to 37.

In the state shown in FIGS. 33 to 37, the long hole 42 passes through the respective elastic locking pieces 31, 31 of the clip 1 and is fitted to the base end portion of the fitting head portion 28. At the same time, each inclined surface of the respective elastic locking pieces 31, 31 inclined obliquely downward toward the flat plate portion 21 comes elastically into contact with each longer side portion of the long hole 42 of the attachment receiving member 41, and pushes the attachment receiving member 41 upward (upward in FIG. 33), so that each clip 1 is locked with the long hole 42. In addition, the seat plate member 33 is pushed against the flat plate member 21 of the clip 1 by the attachment receiving member 41. Further, each positioning locking piece 37 is pressed by the attachment receiving member 41 to be substantially in flush with the lower end surface of said seat plate member 33 (lower end surface in FIG. 37), so that the positioning rib portion 38 protruded from each positioning locking piece 37 is fitted into one of the positioning grooves 10 formed on the upper end surface of the positioning boss portion 11.

As a result, the clip 1 is brought into a locked state with the assembling portion 3 of the attachment member 2 and the attachment member 2 is attached to the attachment receiving member 41. Further, each longer side portion of the long hole 42 of the attachment receiving member 41 is fitted to the base end portion of the fitting head portion 28 of the clip 1. At the same time, it also comes into contact with each inclined surface of the respective elastic locking pieces 31, 31 inclined obliquely downward toward the flat plate portion 21. Thus, the positional deviation and rattling of the attachment member 2 in the direction at right angle relative to the longitudinal direction of the long hole 42 can be prevented.

The clip 1 is locked with the long hole 42 as described above, to attach the attachment member 2 to the attachment receiving member 41. Next, an operation of releasing the locked state of the clip 1 with the long hole 42 to detach the attachment member 2 from the attachment receiving member 41 will be described based on FIGS. 38 to 40.

Figure 40:
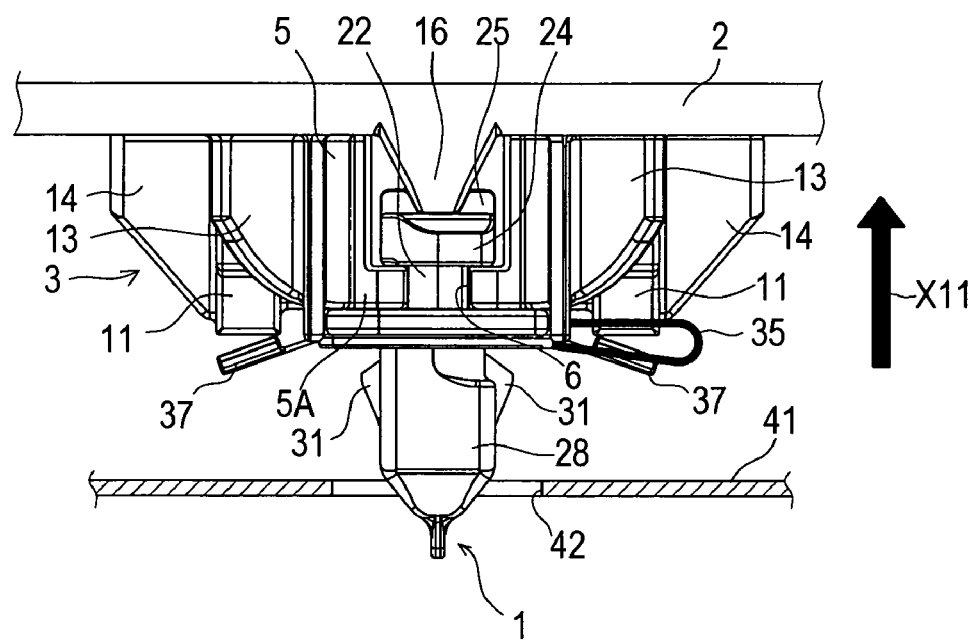
FIG. 40 is a front view showing a state where the clip is detached from the attachment receiving member.

FIG. 38 is a diagram for illustrating a method of releasing the locked state between the clip 1 and the attachment receiving member 41 by means of a tool. FIG. 39 is a bottom surface view in the case where the locked state between the clip 1 and the attachment receiving member 41 is released by means of a tool. FIG. 40 is a front view showing a state where the clip 1 is detached from the attachment receiving member 41.

As shown in FIG. 38, first of all, a tool 100 such as a minus driver is inserted into the tool hole 8 from the opposite side of the attachment member 2 where the assembling portion 3 is formed. Then, the top end portion of the tool 100 is inserted into the recessed portion 26 formed in the convex portion 25 and the flange portion 24.

Then, the tool 100 is rotated counterclockwise (in the direction of the arrow X10). As a result, as described above, the base end portion of the fitting head portion 28 is rotated only by 90 degrees counterclockwise within the long hole 42; the boss portion 22 is rotated only by 90 degrees counterclockwise within the cutaway groove portion 6 to which said boss portion 22 is slipped; and the flange portion 24 is rotated by 90 degrees counterclockwise within the pedestal portion 5 to which it is fitted, due to the axially vertical cross sectional shapes of the base end portion of the fitting head portion 28, the boss portion 22, and the flange portion 24 of the clip 1 vertical to their respective axial directions (see FIGS. 17, 18, and 14). Therefore, the clip 1 rotates by 90 degrees counterclockwise and then stops at this posture.

As a result, as shown in FIG. 39, when the clip 1 is rotated only by 90 degrees counterclockwise (in the direction of the arrow X10) and is stopped, the respective elastic locking pieces 31, 31 are positioned in the longitudinal direction of the long hole 42 of the attachment receiving member 41. Thus, the locked state between the respective elastic locking pieces 31, 31 and the long hole 42 is released.

Subsequently, as shown in FIG. 40, the attachment member 2 is lifted upward (in the direction of the arrow X11) from the attachment receiving member 41 to withdraw the clip 1 from the long hole 42. As a result, the attachment member 2 can be detached from the attachment receiving member 41.

Therefore, according to the clip 1 of this embodiment, the boss portion 22 vertically extended downward from the bottom surface of the flat plate portion 21 of the clip 1 is slipped into a horizontally long cutaway groove portion 6 formed on the upper wall 5A of the pedestal portion 5 of the attachment member 2. Thus, the upper wall 5A of the pedestal portion 5 is pinched between the flat plate portion 21 and the flange 24 formed on the lower end portion of the boss portion 22. As a result, the clip 1 can be always integrally handled with the attachment member 2 to which the clip 1 is assembled. Further, the convex portion 25 formed at the lower end of the flange portion 24 of the clip 1 is brought into contact with the extending portion 17 formed in the base end portion 4, and then, the boss portion 22 of the clip 1 is fitted to the cutaway groove portion 6 of the pedestal portion 5 while depressing the extending portion 17 downward. As a result, the convex portion 25 of the clip 1 is opposed to the top end portion of the extending portion 17, and the clip 1 is prevented from slipping off the pedestal portion 5. In this manner, the clip 1 can be always kept slidable along the cutaway groove portion 6. At the same time, the clip 1 can be always integrally handled with the assembling portion 3 of the attachment member 2 to which the clip 1 is assembled.

Then, the boss portion 22 of the clip 1 is slipped into and assembled to the cutaway groove portion 6 of the pedestal portion 5 in a state where the long hole 36 of the seat plate member 33 is fittingly inserted to the fitting head portion 28 provided on the upper surface of the flat plate portion 21 of the clip 1 in an upright posture along the direction at substantially right angle relative to the longitudinal direction of the cutaway groove portion 6 to bring the seat plate member 33 into contact with the flat plate portion 21. After that, the fitting head portion 28 is fitted to the long hole 42 penetratively formed in the attachment receiving member 41 in the direction at substantially right angle relative to the longitudinal direction of the cutaway groove portion 6. As the fitting head portion 28 is fitted to the long hole 42 penetratively formed in the attachment receiving member 41, the boss portion 22 moves within the cutaway groove portion 6 to bring the seat plate member 33 into contact with the attachment receiving member 41 and also to bring a pair of elastic locking pieces 31 into an elastically locked state with the periphery of each longer side portion of the long hole 42.

As a result of this, the positional deviation of the clip 1 of the attachment member 2 relative to the longitudinal direction (X direction in FIGS. 30 and 35) of the long hole 42 of the attachment receiving member 41 can be absorbed. At the same time, as the boss portion 22 vertically extended downward from the bottom surface of the flat plate portion 21 of the clip 1 moves within the cutaway groove portion 6, the clip 1 moves in the direction at right angle relative to the longitudinal direction of the long hole 42. Thus, the positional direction of the clip 1 of the attachment member 2 in the direction at right angle relative to the longitudinal direction of the long hole 42 of the attachment receiving member 41 can also be absorbed.

Therefore, the positional deviation of the attachment member 2 relative to the attachment receiving member 41 can be easily absorbed in a state where the clip 1 is always integrally handled with the assembling portion 3 of the attachment member 2 to which the clip is assembled. Thus, the attachment member 2 can be attached to the attachment receiving member 41 in an extremely easy one-touch operation. Further, by providing a plurality of pedestal portions 5 to the attachment member 2, after the attachment member 2 is attached to the attachment receiving member 41, the positional deviation relative to the attachment receiving member 41 and rattling of the attachment member 2 due to the impact force externally exerted to the attachment member 2 can be assuredly prevented.

Further, when the seat plate member 33 is depressed to the attachment receiving member 41 to be brought into contact with the flat plate portion 12, each positioning locking piece 37 of the clip 1 is depressed to the attachment receiving member 41 to be substantially in flush with the seat plate member 33. At the same time, the positioning rib portion 38 protruded from the lower surface at the top end portion of each positioning locking piece 37 is fitted to the opposing positioning groove 10 among a plurality of positioning grooves 10 formed on the upper end surface of each positioning boss portion 11 provided to the attachment member 2 in an upright posture.

Accordingly, since the plurality of positioning grooves 10 formed on the upper end surface of each positioning boss portion 11 is arranged in the direction at substantially right angle relative to the longitudinal direction of the cutaway groove portion 6 of the pedestal portion 5, and the width of the long hole 36 of the seat plate member 33 is substantially equal to the width of the fitting head portion 28, as the positioning rib portion 38 protruded from the lower surface at the top end portion of each positioning locking piece 37 is fitted to the opposing positioning groove portion 10, the movement of the clip 1 along the longitudinal direction of the cutaway groove portion 6, that is, the positional deviation in the direction orthogonal to the longitudinal direction of the long hole 42 of the attachment receiving member 41 can be prevented. That is, the positional deviation and rattling of the clip 1 relative to the attachment member 2 due to the impact force exerted after the attachment member 2 is attached to the attachment receiving member 41 can be prevented.

Further, one of the edge portions of the seat plate member 33 in the longitudinal direction of the long hole 36 and the side edge portion of the flat plate portion 21 opposing to the one of the edge portions of the seat plate member 33 are connected to each other by means of a pair of elongated thin plate-like connecting portions 35 formed into such a length that fittingly inserts the fitting head portion 28 into the long hole 36 of the seat plate member 33. Therefore, the seat plate member 33 and the connecting portions 35 can be integrally molded with the flat plate portion 21, and the number of parts can be reduced. Further, since each connecting portion 35 is connected to one of the edge portions of the seat plate member 33 in a longitudinal direction of the long hole 36, when each connecting portion 35 is folded to fittingly insert the fitting head portion 28 into the long hole 36 of the seat plate member 33, the inserting direction of the seat plate member 33 can be aligned to the fitting head portion 28. As a result, the operability can be enhanced.

Further, the locked state between a pair of elastic locking pieces 31 of the clip 1 and the long holes 42 of the attachment receiving member 41 can be released by inserting the tool 100 through the tool hole 8 into the recessed portion 26 of the clip 1 and rotating the clip 1 by 90 degrees counterclockwise. Because of this structure, the attachment member 2 can be detached from the attachment receiving member 41 in an extremely easy operation as is the case of screw cramp.

The present invention is not limited to the foregoing embodiment. It is a matter of course that various improvements and modifications are possible as far as not departing from the gist of the present invention. For example, the present invention may be modified as follows.

(A) In the foregoing embodiment, one positioning rib portion 38 is provided to each positional locking piece 37. Alternatively, two or more (for example, three) positioning rib portions 38 may be provided to each positional locking piece 37. In this manner, the positional deviation relative to the attachment member 2 and rattling of the clip 1 due to the impact force exerted after the attachment member 2 is attached to the attachment receiving member 41 can be more assuredly prevented.

(B) In the foregoing embodiment, the clip 1 is attached to the cutaway groove portion 6 of the pedestal portion 5 after the seat plate member 33 is fittingly inserted to the fitting head portion 28 of the clip 1. Alternatively, the seat plate member 33 may be fittedly inserted into the fitting head portion 28 after the clip 1 is attached to the cutaway groove portion 6 of the pedestal portion 5.

(C) In the foregoing embodiment, the recessed portion 26 of the clip 1 is formed into a substantially horizontally long square shape in an axial cross section. Alternatively, the recessed portion 26 may be formed into a substantially hexagonal shape in an axial cross section. In this case, a hexagonal wrench and the like is used to rotate the clip 1 counterclockwise so as to remove the attachment member 2 from the attachment receiving member 41.

(D) In the foregoing embodiment, the flat plate portion 21 of the clip 1 and the seat plate member 33 are connected to each other by means of a pair of connecting portion 35. Alternatively, the seat plate member 33 may be independent from the flat plate member 21 without being connected by means of the connecting portions 35.

The invention claimed is:

1. A clip assembled to an upper surface portion of a pedestal portion provided on one surface of an attachment member and used to attach the attachment member to an attachment receiving member,
   wherein the pedestal portion comprises a horizontally long cutaway groove portion protruded into a substantially square-bracket-like shape opened downward when seen from a side view and formed inward from a side surface portion at one side of an upper wall,
   the attachment member comprises a pair of positioning boss portions provided in an upright posture outside opposite side wall portions of the pedestal portion and formed with a plurality of positioning grooves on its upper end surface portion formed successively in a direction at a substantially right angle relative to a longitudinal direction of the cutaway groove portion,
   wherein the clip comprising:
   a flat plate portion to be brought into contact with an upper surface portion of the upper wall;
   a boss portion extended vertically downward from a bottom surface of the flat plate portion and has a width substantially equal to a width of the cutaway groove portion, and is fitted to the cutaway groove portion;
   a flange portion having a predetermined thickness and extended from a lower end portion of the boss portion outward to the opposite sides of the cutaway groove portion so as to be brought into contact with a bottom surface portion of the upper wall;
   a fitting head portion having a substantially square shape when seen from top, provided in an upright posture on an upper surface of the flat plate portion and fitted to a first long hole penetratively formed in the attachment receiving member along a direction at a substantially right angle relative to a longitudinal direction of the cutaway groove portion;
   a pair of elastic locking pieces elastically deformable in an insertion direction of the fitting head portion, the elastic locking pieces provided on opposite side surface portions of the fitting head portion in a longitudinal direction of the cutaway groove portion, and each being formed with a locking protrusion in an upright posture outward from its lower end to a predetermined height; and
   a flat plate-like seat plate member formed with a second long hole having a width substantially equal to a width of the fitting head portion in a direction at a substantially right angle relative to a longitudinal direction of the cutaway groove portion, and the fitting head portion being fittingly inserted into the second long hole so as to be brought into contact with the upper surface of the flat plate portion;

a pair of positioning locking pieces elastically deformable in the vertical direction, each having a protruded positioning rib to be fitted to one of the positioning grooves on a lower surface of a top end of each position locking piece, and extended outward from both end edges in the longitudinal direction of the second hole of the seat plate member, wherein, as the fitting head portion is fitted to the first long hole penetratively formed in the attachment receiving member, the boss portion moves within the cutaway groove portion to bring the seat plate member into contact with the attachment receiving member and to elastically lock the pair of elastic locking pieces with a periphery of each longer side portion of the first long hole, and when an upper end surface of the seat plate member is brought into contact with the attachment receiving member, the positioning locking piece is depressed by the attachment receiving member to be in substantially flush with an upper end surface of the seat plate member, and at the same time, the positioning rib portion is fitted to the opposing one positioning groove portion.

2. A clip according to claim 1 further comprising an elongated thin plate-like connecting portion for connecting one of the edges in a longitudinal direction of the second long hole of the seat plate member to be brought into contact with the flat plate portion and a side edge of the flat plate portion opposing the corresponding edge, wherein the connecting portion is formed into such a length that fittingly inserts the fitting head portion into the second long hole of the seat plate member.

3. A clip according to claim 2, further comprising a convex portion protruded from a midportion at a lower end of the flange portion, wherein the attachment member comprising:

a rib portion provided in an upright posture outward from one of side surfaces of the upper wall of the pedestal portion; and an extending portion elastically deformable downward, extending from a height opposing to a convex portion of the rib portion substantially vertically up to an inlet portion of the cutaway groove portion, wherein, when the boss portion is fitted to the cutaway groove portion, the convex portion moves while depressing the extending portion downward.

4. A clip according to claim 3, wherein the attachment member has a tool hole penetratively formed in the pedestal portion at a position opposing to the upper wall, the convex portion of the flange portion has a recessed portion which is formed on a bottom surface portion and into which a top end portion of a tool is inserted, portions of the fitting head portion opposing to inner peripheral surfaces of the first long hole and the second long hole and the boss portion respectively constitute a substantially square shape as a whole in a horizontal cross section, and a pair of opposing corners creates a circular arc having one side of the square as a diameter, and the other opposing corners create substantially a right angle, and a tool is inserted into the recessed portion through the tool hole to be rotated by 90 degrees counterclockwise so as to release a locked state between the first long hole and the pair of elastic locking pieces.

5. A clip according to claim 1, further comprising a convex portion protruded from a midportion at a lower end of the flange portion, wherein the attachment member comprising:

a rib portion provided in an upright posture outward from one of side surfaces of the upper wall of the pedestal portion; and an extending portion elastically deformable downward, extending from a height opposing to a convex portion of the rib portion substantially vertically up to an inlet portion of the cutaway groove portion, wherein, when the boss portion is fitted to the cutaway groove portion, the convex portion moves while depressing the extending portion downward.

6. A clip according to claim 5, wherein the attachment member has a tool hole penetratively formed in the pedestal portion at a position opposing to the upper wall, the convex portion of the flange portion has a recessed portion which is formed on a bottom surface portion and into which a top end portion of a tool is inserted, portions of the fitting head portion opposing to inner peripheral surfaces of the first long hole and the second long hole and the boss portion respectively constitute a substantially square shape as a whole in a horizontal cross section, and a pair of opposing corners creates a circular arc having one side of the square as a diameter, and the other opposing corners create substantially a right angle, and a tool is inserted into the recessed portion through the tool hole to be rotated by 90 degrees counterclockwise so as to release a locked state between the first long hole and the pair of elastic locking pieces.

* * * * *